United States Patent
Maeno

(10) Patent No.: US 7,054,555 B2
(45) Date of Patent: May 30, 2006

(54) COMMUNICATION NETWORK, WAVELENGTH DIVISION MULTIPLEX TRANSMISSION EQUIPMENT, OPTICAL SWITCH EQUIPMENT, AND OPTICAL ATTRIBUTE/STATE ADMINISTERING METHOD FOR THEM

(75) Inventor: Yoshiharu Maeno, Tokyo (JP)

(73) Assignee: NEC Corporation (JP)

( * ) Notice: Subject to any disclaimer, the term of this patent is extended or adjusted under 35 U.S.C. 154(b) by 911 days.

(21) Appl. No.: 10/053,560

(22) Filed: Jan. 24, 2002

(65) Prior Publication Data

US 2002/0097954 A1   Jul. 25, 2002

(30) Foreign Application Priority Data

Jan. 24, 2001   (JP)   ............... 2001-015168

(51) Int. Cl.
   *H04B 10/08* (2006.01)
(52) U.S. Cl. ..................... 398/31; 398/33; 398/48; 398/55
(58) Field of Classification Search .................. 398/16, 398/19, 30, 31, 33, 48–51, 55–57, 101
   See application file for complete search history.

(56) References Cited

U.S. PATENT DOCUMENTS

| 6,046,833 | A  | * | 4/2000 | Sharma et al. ................ 398/48 |
| 6,185,020 | B1 | * | 2/2001 | Horiuchi et al. .............. 398/31 |
| 6,771,904 | B1 | * | 8/2004 | Sasaki et al. ................. 398/25 |
| 2002/0041413 | A1 | * | 4/2002 | Wang et al. ................. 359/128 |
| 2002/0109879 | A1 | * | 8/2002 | Wing So .................... 359/118 |

FOREIGN PATENT DOCUMENTS

| JP | 2000-4460   | 1/2000 |
| JP | 2000-183853 | 6/2000 |

* cited by examiner

*Primary Examiner*—Christina Y Leung
(74) *Attorney, Agent, or Firm*—Dickstein, Shapiro, Morin & Oshinsky, LLP.

(57) ABSTRACT

There is defined an optical link section which leads from output interfaces of an optical switch equipment to the input interfaces of an optical switch equipment. In-band control channels for every optical links are interposed between the optical switch equipments and an optical multiplex section. The in-band control channels exchanges the optical link attributes specified by the interfaces of the optical switch equipments and the optical link attributes specified by the optical multiplex section, mutually as control messages.

60 Claims, 14 Drawing Sheets

FIG. 4A

| ATTRIBUTE ITEMS | IF11 | IF12 | IF13 | IF14 |
|---|---|---|---|---|
| OUTPUT OPTICAL SWITCH NO. | 1 | 1 | 1 | 1 |
| OUTPUT IF NO. | 1 | 2 | 3 | 4 |
| WAVELENGTH | ARBITRARY | ARBITRARY | $\lambda 1$ | $\lambda 1$ |
| SIGNAL RATE | ARBITRARY | ARBITRARY | 1Gbit/s | 2.5Gbit/s |
| SIGNAL FORMAT | ARBITRARY | ARBITRARY | GEther | SONET |

FIG. 4B

| ATTRIBUTE ITEMS | IF25 | IF26 | IF27 | IF28 |
|---|---|---|---|---|
| INPUT OPTICAL SWITCH NO. | 5 | 5 | 5 | 5 |
| INPUT IF NO. | 5 | 6 | 7 | 8 |
| WAVELENGTH | ARBITRARY | ARBITRARY | ARBITRARY | ARBITRARY |
| SIGNAL RATE | ARBITRARY | ARBITRARY | 2.5Gbit/s | 1Gbit/s |
| SIGNAL FORMAT | ARBITRARY | ARBITRARY | SONET | GEther |

| ATTRIBUTE ITEMS | PT11 | PT12 | PT13 | PT14 |
|---|---|---|---|---|
| WAVELENGTH | λ2 | λ1 | λ2, λ4 | λ1, λ3 |
| SIGNAL RATE | ≤40 Gbit/s | ≤40 Gbit/s | ≤10 Gbit/s | ≤10 Gbit/s |
| SIGNAL FORMAT | ARBITRARY | ARBITRARY | ARBITRARY | ARBITRARY |
| OMS GROUP NO. | 2 | 2 | 1 | 1 |

FIG. 6A

| ATTRIBUTE ITEMS | PT25 | PT26 | PT27 | PT28 |
|---|---|---|---|---|
| WAVELENGTH | λ1 | λ2 | λ1, λ3 | λ2, λ4 |
| SIGNAL RATE | ≤40 Gbit/s | ≤40 Gbit/s | ≤10 Gbit/s | ≤10 Gbit/s |
| SIGNAL FORMAT | ARBITRARY | ARBITRARY | ARBITRARY | ARBITRARY |
| OMS GROUP NO. | 2 | 2 | 1 | 1 |

CC11
IF11→PT14
ATTRIBUTE ITEMS

| | |
|---|---|
| OUTPUT OPTICAL SWITCH NO. | 1 |
| OUTPUT IF NO. | 1 |
| WAVELENGTH | ARBITRARY |
| SIGNAL RATE | ARBITRARY |
| SIGNAL FORMAT | ARBITRARY |

FIG. 7B

CC12
IF12→PT13
ATTRIBUTE ITEMS

| | |
|---|---|
| OUTPUT OPTICAL SWITCH NO. | 1 |
| OUTPUT IF NO. | 2 |
| WAVELENGTH | ARBITRARY |
| SIGNAL RATE | ARBITRARY |
| SIGNAL FORMAT | ARBITRARY |

FIG. 7C

CC13
IF13→PT12
ATTRIBUTE ITEMS

| | |
|---|---|
| OUTPUT OPTICAL SWITCH NO. | 1 |
| OUTPUT IF NO. | 3 |
| WAVELENGTH | $\lambda 1$ |
| SIGNAL RATE | 1 Gbit/s |
| SIGNAL FORMAT | GEther |

FIG. 7D

CC14
IF14→PT11
ATTRIBUTE ITEMS

| | |
|---|---|
| OUTPUT OPTICAL SWITCH NO. | 1 |
| OUTPUT IF NO. | 4 |
| WAVELENGTH | $\lambda 1$ |
| SIGNAL RATE | 2.5 Gbit/s |
| SIGNAL FORMAT | SONET |

CC16,22
　　PT14, 13→PT27,28
　　ATTRIBUTE ITEMS

| OUTPUT OPTICAL SWITCH NO. | 1 | 1 |
|---|---|---|
| OUTPUT IF NO. | 1 | 2 |
| WAVELENGTH | λ1, λ3 | λ2, λ4 |
| SIGNAL RATE | ≤10 Gbit/s | ≤10 Gbit/s |
| SIGNAL FORMAT | ARBITRARY | ARBITRARY |
| OMS GROUP NO. | 1 | 1 |

FIG. 8A

CC15,21
　　PT12, 11→PT25,26
　　ATTRIBUTE ITEMS

| OUTPUT OPTICAL SWITCH NO. | 1 | 1 |
|---|---|---|
| OUTPUT IF NO. | 3 | 4 |
| WAVELENGTH | λ1 | ERROR |
| SIGNAL RATE | 1 Gbit/s | 2.5Gbit/s |
| SIGNAL FORMAT | GEther | SONET |
| OMS GROUP NO. | 2 | 2 |

CC26
PT27→IF26
ATTRIBUTE ITEMS

| OUTPUT OPTICAL SWITCH NO. | 1 |
|---|---|
| OUTPUT IF NO. | 1 |
| WAVELENGTH | $\lambda 1, \lambda 3$ |
| SIGNAL RATE | $\leq 10$ Gbit/s |
| SIGNAL FORMAT | ARBITRARY |
| OMS GROUP NO. | 1 |

FIG. 9B

CC25
PT28→IF25
ATTRIBUTE ITEMS

| OUTPUT OPTICAL SWITCH NO. | 1 |
|---|---|
| OUTPUT IF NO. | 2 |
| WAVELENGTH | $\lambda 2, \lambda 4$ |
| SIGNAL RATE | $\leq 10$ Gbit/s |
| SIGNAL FORMAT | ARBITRARY |
| OMS GROUP NO. | 1 |

FIG. 9C

CC28
PT25→IF28
ATTRIBUTE ITEMS

| OUTPUT OPTICAL SWITCH NO. | 1 |
|---|---|
| OUTPUT IF NO. | 3 |
| WAVELENGTH | $\lambda 1$ |
| SIGNAL RATE | $\leq 1$ Gbit/s |
| SIGNAL FORMAT | GEther |
| OMS GROUP NO. | 2 |

FIG. 9D

CC27
PT26→IF27
ATTRIBUTE ITEMS

| OUTPUT OPTICAL SWITCH NO. | 1 |
|---|---|
| OUTPUT IF NO. | 4 |
| WAVELENGTH | ERROR |
| SIGNAL RATE | 2.5Gbit/s |
| SIGNAL FORMAT | SONET |

| ATTRIBUTE ITEMS | | | | |
|---|---|---|---|---|
| OUTPUT OPTICAL SWITCH NO. | 1 | 1 | 1 | 1 |
| OUTPUT IF NO. | 1 | 2 | 3 | 4 |
| WAVELENGTH | λ1, λ3 | λ2, λ4 | λ1 | ERROR |
| SIGNAL RATE | ≤10 Gbit/s | ≤10 Gbit/s | 10 Gbit/s | 2.5 Gbit/s |
| SIGNAL FORMAT | ARBITRARY | ARBITRARY | GEther | SONET |
| OMS GROUP NO. | 1 | 1 | 2 | 2 |
| INPUT OPTICAL SWITCH NO. | 5 | 5 | 5 | 5 |
| INPUT IF NO. | 6 | 5 | 8 | 7 |

COMMUNICATION NETWORK, WAVELENGTH DIVISION MULTIPLEX TRANSMISSION EQUIPMENT, OPTICAL SWITCH EQUIPMENT, AND OPTICAL ATTRIBUTE/STATE ADMINISTERING METHOD FOR THEM

BACKGROUND OF THE INVENTION

This invention broadly relates to a communication network, a wavelength multiplexing device, an optical switch equipment, and an optical link attribute/state administering method for them.

More specifically, this invention is directed to a method for administering the attributes and states of optical links between transparent optical switch equipments in a communication network including a number of optical switch equipments connected with each other by using WDM (Wavelength Division Multiplex) transmission equipments.

In a conventional trunk optical communication network, a plurality of optical switch equipments are mutually connected in a mesh-shape via optical fibers. On these optical fibers, signals, which are wave-multiplexed by the use of a WDM transmission equipment, are transmitted. Herein, the wavelength multiplexing number per optical fiber is equal to 100 at the maximum.

The above-mentioned optical switch equipments are classified into two types. One type corresponds to an opaque optical switch equipment which once photo-electrically converts an optical signal into an electric signal via interfaces. In the opaque optical switch equipment, electric signal processing thereof is restricted in signal rate to a constant value. However, control signals can be easily and advantageously exchanged between optical switch equipments.

Another type corresponds to a transparent optical switch equipment without use of photo-electric conversion. In such a transparent optical switch equipment, general switching of wavelength-multiplexed signals as well as switching for signals of an arbitrary signal rate or signal format can be carried out advantageously. On the contrary, the control signals can not be readily exchanged between the optical switches without the electric signal processing.

Under above-described circumstance, the optical switch equipment functions as to the transparent optical switch equipment for some interfaces. The optical switch serves as the transparent optical switch in a wide sense even when the electric signals are processed via the other interface. The transparent optical switch normally serves as a part of optical fibers, and therefore is seldom switched as a switch device.

The optical switch equipment is connected not only with another optical switch equipment but also with a device acting as a client of the trunk optical communication network, such as the SONET (Synchronous Optical Network), the ATM (Asynchronous Transfer Mode) switch and the IP (Internet Protocol) router.

The trunk optical communication network provides optical paths between a plurality of client devices by employing one or more wavelengths. The optical paths are set up so as to lead from an input optical switch equipment connected with a client device through a plurality of relay optical switch equipment to an output optical switch equipment connected with another client device.

In such a trunk optical communication network, the optical paths are administered in dependency upon multiple administrative hierarchies. These administrative hierarchies include an optical path section between client devices, an optical path relay section between wavelength converters or 3R (Reshaping, Retiming and Regeneration) regenerating relays, an optical-multiplex-section (OMS) between WDM transmission equipments, and an optical-transmission-section (OTS) between optical amplifiers (amplifiers).

According to these administrative hierarchies, administrations are performed so as to set up or release optical paths and to detect or recover faults. As illustrated in FIG. 1, one optical path relay section of a wavelength λ1 is defined between an opaque optical switch equipment #1 and an opaque optical switch equipment #3, each having a wavelength converter. This optical path relay section includes a transparent optical switch equipment #2 and two optical multiplex sections.

Referring to FIG. 1, wavelength converters 70 to 75 and WDM transmission equipments 91, 92 are connected between the opaque optical switch equipment #1 and the transparent optical switch equipment #2 via the optical amplifier #1. While, the WDM transmission equipments 93 and 94 are connected between the transparent optical switch equipment #2 and the opaque optical switch equipment #3 through the optical amplifier #2. Herein, it is noted that reference numerals 80 to 85 designate wavelength converters, and reference numerals 90 and 95 designate WDM transmission equipments, respectively. Meanwhile, the technique for administering the network according to such administrative hierarchies is disclosed in Japanese Unexamined Patent Publication No. 2000-183853.

In the above-mentioned trunk optical communication network, the optical paths are dynamically set up and released on the basis of a demand from a client device. The route control softwares installed on the respective optical switch equipments compute or calculate an optimum optical path route reaching the optical switch equipment connected with an address client device, thereby producing a route table describing the corresponding relations with respect to output interfaces between an optical switch equipment connected with the address client device and an own optical switch equipment for setting up the route of the optical path.

The computed optical paths are set up and released for every hierarchies in accordance with the administrative layer. In the system shown in FIG. 1, for example, the relay optical switch equipments #1 and #3 along the optical path are selected so as to set up and released the optical paths in the optical path relay section, thus setting up the optical path relay section to the wavelength λ1. The setup of the optical switch equipment is carried out on the control channel, which is preliminarily provided between the optical switch equipments, by exchanging the control messages with respect to the address or the identification No. of the optical path mutually. Herein, the technique of this control channel is disclosed in Japanese Unexamined Patent Publication No. 2000-004460.

In the above-described conventional communication network, however, no administrative hierarchy for administering the sections between adjoining optical switch equipments exists, Consequently, the transparent optical switch equipment will be administratively regarded as a part of the optical fibers laid in the optical path relay section even when the transparent optical switch equipment exists in the optical path relay section, as illustrated in FIG. 1. This makes it impossible to recognize the section between the interface of the transparent optical switch equipment and the interface of the adjoining optical switch equipment, as an administration target independent as the optical link. Not only the transparent optical switch equipment but also the aforementioned optical link is not recognized as the setting target during setting up and releaseing the optical path.

In the control channel, which is preliminarily provided separately of the optical link between the optical switch equipments, the control message cannot be exchanged for every optical links. Further, such a control channel is not arranged between the optical switch equipment and the WDM transmission equipment contained in the optical multiplex section. Therefore, the control message cannot be exchanged between the optical switch equipment and the optical multiplex section. Moreover, the optical switch equipment cannot obtain information upon the attributes of the optical link specified by the optical multiplex section. Accordingly, the automatic discovery of the attributes and the administration of the state of the optical link specified by both the adjoining optical switch equipments and the optical multiplex section cannot be carried out by utilizing the conventional technique of the control channel.

In addition, the attributes of the optical link between the optical switch equipments cannot be discovered. Therefore, the mutual connection relations between the interfaces of the optical switch equipments cannot be autonomously discovered so that the route control software cannot produce the route table automatically.

Therefore, in the case where at least one of two adjoining optical switch equipments corresponds to the transparent optical switch equipment, the attributes of the optical link leading from the output interfaces (IF) of the optical switch equipment through the optical multiplex section to the input interfaces of the adjoining optical switch equipment can not be automatically discovered to administer the state at the unit of optical link.

Further, when the optical switch equipment sets up the optical path to another optical switch equipment, the optical switch equipment cannot autonomously determine an output interface to be employed. Therefore, it is necessary to manually set up the route table describing the corresponding relations between the optical switch equipment connected with an address client device and the output interfaces of an own optical switch equipment for setting up the route of the optical path.

SUMMARY OF THE INVENTION

It is therefore an object of the this invention to provide a communication network, a wavelength multiplexing device, an optical switch equipment and an optical link attribute/state administering method which are capable of autonomously discovering the attributes of every optical links and the mutual connection relations between the interfaces of optical switch equipments to administer the states at the unit of optical link when at least one of two adjoining devices corresponds to a transparent optical switch equipment.

According to a first aspect of the invention, a communication network has a plurality of optical communication devices connected with each other.

With this structure, uni-directional in-band control channels are provided in every optical links leading from the output interfaces of one of adjoining first and second optical communication devices to the input interfaces of the other of the first and second optical communication devices, between the interfaces of the first and second optical communication devices along and for the every optical links.

An out-band control channel is provided between the first and second optical communication devices.

Under this circumstance, the first and second optical communication devices include: control channel terminators for terminating the uni-directional in-band control channels and the out-band control channel; and optical link controllers for administering the every optical links by exchanging control messages through the control channel terminators.

According to a second aspect of the invention, a communication network has a plurality of optical communication devices connected with each other.

With this structure, a first uni-directional in-band control channel is provided in every downstream optical links leading from the output interfaces of one of adjoining first and second optical communication devices to the input interfaces of the other of the first and second optical communication devices, between the interfaces of the first and second optical communication devices along and for the every downstream optical links.

A second uni-directional in-band control channel is provided in every upstream optical links leading from the output interfaces of the other of the first and second optical communication devices to the input interfaces of the one of the first and second optical communication devices, between the interfaces of the first and second optical communication devices along and for the every upstream optical links and directed in the direction opposite to the control channel in the downstream optical links.

Under this circumstance, the first and second optical communication devices include: control channel terminators for terminating the first and second uni-directional in-band control channels, respectively; and optical link controllers for administering the every optical links by exchanging control messages through the control channel terminators.

According to a third aspect of the invention, a communication network has a plurality of optical communication devices connected with each other.

With this structure, a bi-directional in-band control channel is provided in every optical links leading from the output interfaces of one of adjoining first and second optical communication devices to the input interfaces of the other of the first and second optical communication devices, between the interfaces of the first and second optical communication devices along and for the every optical links.

Under this circumstance, the first and second optical communication devices include: a control channel terminator for terminating the bi-directional in-band control channels; and optical link controllers for administering the every optical links by exchanging control messages through the control channel terminators.

According to a fourth aspect of the invention, a communication network has a plurality of optical communication devices connected with each other through WDM transmission equipments.

In this condition, a first uni-directional in-band control channel is provided in every optical links leading from the output interfaces of one of first and second optical communication devices, which adjoin each other through an optical multiplex section including at least one set of opposed WDM transmission equipments and an arbitrary number of optical amplifiers between the opposed WDM transmission equipments, to the input interfaces of the other of the first and second optical communication devices through the optical multiplex section, between the interfaces of the first and second optical communication devices and the ports of the WDM transmission equipments connected with the interfaces, along and for the every optical links.

A second uni-directional in-band control channel is provided in the optical multiplex section between the output ports of one of the opposed WDM transmission equipments and the input ports of the other, along the optical links.

An out-band control channel is provided between the first and second optical communication devices.

Under this circumstance, the first and second optical communication devices include; control channel terminators for terminating the first uni-directional in-band control channels and the out-band control channel; and optical link controllers for administering the every optical links by exchanging control messages through the control channel terminators.

The opposed WDM transmission equipments include: control channel terminators for terminating the first and second uni-directional in-band control channels; and optical link controllers for administering the every optical links by exchanging control messages through the control channel terminators.

According to a fifth aspect of the invention, a communication network has a plurality of optical communication devices connected with each other through WDM transmission equipments.

With this structure, a first uni-directional in-band control channel is provided in every downstream optical links leading from the output interfaces of one of first and second optical communication devices, which adjoin each other through an optical multiplex section including at least one set of opposed WDM transmission equipments for transmitting downstream and upstream signals individually and an arbitrary number of optical amplifiers between the opposed WDM transmission equipments, to the input interfaces of the other of the first and second optical communication devices through the optical multiplex section, between the interfaces of the first and second optical communication devices and the ports of the WDM transmission equipments connected with the interfaces, along and for the every downstream optical links.

A second uni-directional in-band control channel is provided in the optical multiplex section between the output ports of one of the opposed WDM transmission equipments for transmitting the downstream signals and the input ports of the other, along the downstream optical links.

A third uni-directional in-band control channel is provided in every upstream optical links leading from the output interfaces of the other optical communication device of the first and second optical communication devices through the optical multiplex section to the input interfaces of the one optical communication device of the first and second optical communication devices, between the interfaces of the first and second optical communication devices and the ports of the WDM transmission equipment connected with the interfaces, along and for the every upstream downstream optical links and directed in the direction opposite to the control channels in the downstream optical links.

A fourth uni-directional in-band control channel is provided in the optical multiplex section between the output ports of one of the opposed WDM transmission equipments for transmitting the upstream signals and the input ports of the other and directed in the direction opposite to the control channels in the downstream optical links, along the upstream optical links.

Under this circumstance, the first and second optical communication devices include: control channel terminators for terminating the first and third uni-directional in-band control channels; and optical link controllers for administering the every optical links by exchanging control messages through the control channel terminators.

The opposed WDM transmission equipments for transmitting the downstream signals include: control channel terminators for terminating the first and second uni-directional in-band control channels; and optical link controllers for administering the every optical links by exchanging control messages through the control channel terminators.

The opposed WDM transmission equipments for transmitting the upstream signals include: control channel terminators for terminating the third and fourth uni-directional in-band control channels; and optical link controllers for administering the every optical links by exchanging control messages through the control channel terminators.

According to a sixth aspect of the invention, a communication network has a plurality of optical communication devices connected with each other through WDM transmission equipments.

In this condition, a first bi-directional in-band control channel is provided in every optical links leading from the output interfaces of one optical communication device of first and second optical communication devices, which adjoin each other through an optical multiplex section including at least one set of opposed WDM transmission equipments and an arbitrary number of optical amplifiers between the opposed WDM transmission equipments, to the input interfaces of the other optical communication device of the first and second optical communication devices through the optical multiplex section, between the interfaces of the first and second optical communication devices and the ports of the WDM transmission equipments connected with the interfaces, along and for the every optical links.

A second bi-directional in-band control channel is provided in the optical multiplex section between the output ports of one of the opposed WDM transmission equipments and the input ports of the other, along the optical links.

Under this circumstance, the first and second optical communication devices include: control channel terminators for terminating the first bi-directional in-band control channel; and optical link controllers for administering the every optical links by exchanging control messages through the control channel terminators, and The opposed WDM transmission equipments include: control channel terminators for terminating the first and second bi-directional in-band control channels; and optical link controllers for administering the every optical links by exchanging control messages through the control channel terminators.

According to another first aspect of the invention, there is provided a WDM transmission equipment for forming an optical multiplex section together with opposed devices and an arbitrary number of optical amplifiers between the opposed devices.

With this condition, a uni-directional in-band control channel is provided in the optical multiplex section between the input/output ports of the opposed devices and along all optical links through the optical multiplex section;

A control channel terminator terminates the uni-directional in-band control channel.

Optical link controllers administer the every optical links by exchanging control messages through the control channel terminators.

According to another second aspect of the invention, there is provided a WDM transmission equipment for forming an optical multiplex section together with opposed devices for transmitting downstream and upstream signals, respectively, and an arbitrary number of optical amplifiers between the opposed devices.

In this condition, a first uni-directional in-band control channel is provided in the optical multiplex section between the input/output ports of the opposed devices and along all downstream optical links through the optical multiplex section.

A second uni-directional in-band control channel is provided in the optical multiplex section between the input/output ports of the opposed devices and along all upstream optical links through the optical multiplex section and directed in the direction opposite to the control channels in the downstream optical links.

A control channel terminator terminates the first and second uni-directional in-band control channel.

Optical link controllers administer the every optical links by exchanging control messages through the control channel terminators.

According to another third aspect of the invention, there is provided a WDM transmission equipment for forming an optical multiplex section together with opposed devices and an arbitrary number of optical amplifiers between the opposed devices.

With this structure, a bi-directional in-band control channel is provided in the optical multiplex section between the input/output ports of the opposed devices and along all optical links through the optical multiplex section.

A control channel terminator terminates the bi-directional in-band control channel, Optical link controllers administer the every optical links by exchanging control messages through the control channel terminators.

According to another first aspect of the invention, there is provided an optical link attribute/state administrating method for a communication network having a plurality of optical communication devices connected with each other.

Under this condition, an optical link section leading from the output interfaces of a first optical communication device of a transmission source to the input interfaces of an adjoining second optical communication device is defined.

In-band control channels are provided for every optical links between the first and second optical communication devices; and exchanging the optical link attributes, as specified by the interfaces of the first and second optical communication devices, as control messages through the in-band control channels.

According to another second aspect of the invention, there is provided an optical link attribute/state administrating method for a communication network having a plurality of optical communication devices connected with each other through a WDM transmission equipment.

Under this condition, an optical link section leading from the output interfaces of a first optical communication device of a transmission source to the input interfaces of an adjoining second optical communication device is defined.

In-band control channels are provided for every optical links along optical links between the first and second optical communication devices and an optical multiplex section; and exchanging the optical link attributes, as specified by the interfaces of the first and second optical communication devices, and the optical link attributes, as specified by the optical multiplex section, as control messages through the in-band control channels.

According to another first aspect of the invention, there is provided an optical switch equipment wherein the common portion of attribute informations owned by individual devices in an optical link, to which an own device belongs, is the attribute information of the optical link.

According to another second aspect of the invention, there is provided an optical switch equipment connected with adjoining optical communication device.

With this structure, uni-directional in-band control channels are provided in every optical links leading from output interfaces to the input interfaces of the adjoining optical communication devices, between the interfaces of the adjoining optical communication devices for the every optical links.

An out-band control channel is provided between the adjoining optical communication devices.

Control channel terminators terminates the uni-directional in-band control channel and the out-band control channel.

Optical link controllers administer the every optical links by exchanging control messages through the control channel terminators.

According to another third aspect of the invention, there is provided an optical switch equipment connected with adjoining optical communication device.

In this condition, a first uni-directional in-band control channel is provided in every downstream optical links leading from output interfaces to the input interfaces of the adjoining optical communication devices, between the interfaces of the adjoining optical communication devices for the every downstream optical links.

A second uni-directional in-band control channel is provided in every upstream optical links leading from the output interfaces of the adjoining optical communication devices to the input interfaces of the own device, between the interfaces of the adjoining optical communication devices for the every upstream optical links and directed in the direction opposite to the control channel in the downstream optical links.

Control channel terminators terminate the first and second uni-directional in-band control channels.

Optical link controllers administer the every optical links by exchanging control messages through the control channel terminators.

According to another fourth aspect of the invention, there is provided an optical switch equipment connected with adjoining optical communication device.

With this structure, a bi-directional in-band control channel is provided in every optical links leading from output interfaces to the input interfaces of the adjoining optical communication devices, between the interfaces of the adjoining optical communication devices for the every optical links.

A control channel terminator terminates the bi-directional in-band control channel.

Optical link controllers administer the every optical links by exchanging control messages through the control channel terminators.

Specifically, in the communication network according to this invention, an optical link section as an intermediate administrative hierarchy between an optical multiplex section and an optical path relay section is defined at a portion of an optical link leading from the output interfaces of an optical switch equipment to the input interfaces of an adjoining optical switch equipment, and in-band control channels are provided for every optical links between the optical switch equipments and the optical multiplex section.

This in-band control channel executed the actions to exchange the optical link attributes specified by the output interfaces of the optical switch equipment, the optical link attributes specified by the optical multiplex section and the optical link attributes specified by the input interfaces of the adjoining optical switch equipment, mutually as control messages.

Therefore, the attributes of every optical links and the mutual connection relations between the interfaces of the optical switch equipments can be autonomously discovered to thereby eliminate the troublesome or erroneous manual setting of the attributes of the optical links and the route table.

In other words, in the case that at least one of two adjoining devices corresponds to a transparent optical switch equipment, the attributes of the optical link leading from the output interfaces of the optical switch equipment to the input interfaces of the adjoining optical switch equipment and the mutual connection relations between the interfaces of the optical switch equipments can be autonomously discovered to produce the route table automatically, thus administering the states at the unit of optical link.

BRIEF DESCRIPTION OF THE DRAWINGS

FIG. 4A is a diagram showing an optical link attributes which are specified by an output interface of an optical switch equipment illustrated in FIG. 2;

FIG. 4B is a diagram of an optical link attributes which are specified by an output interface of an optical switch equipment illustrated in FIG. 2;

FIG. 6A is a diagram showing an optical link attributes which are specified by an input interface of a WDM transmission equipment illustrated in FIG. 2;

FIG. 6B is a diagram of an optical link attributes which are specified by an output port of a WDM transmission equipment;

FIG. 7A is a diagram showing a control message on an in-band control channel CC11 illustrated in FIG. 2;

FIG. 7B is a diagram showing a control message on an in-band control channel CC12 illustrated in. FIG. 2;

FIG. 7C is a diagram showing a control message on an in-band control channel CC13 illustrated in FIG. 2;

FIG. 7D is a diagram showing a control message on an in-band control channel CC14 illustrated in FIG. 2;

FIG. 8A is a diagram showing a control message on in-band control channels CC16 and CC22 illustrated in FIG. 2;

FIG. 8B is a diagram showing a control message on in-band control channels CC15 and CC21;

FIG. 9A is a diagram showing a control message on an in-band control channel CC26 illustrated in FIG. 2;

FIG. 9B is a diagram showing a control message on an in-band control channel CC25 illustrated in FIG. 2;

FIG. 9C is a diagram showing a control message on an in-band control channel CC28 illustrated in FIG. 2;

FIG. 9D is a diagram showing a control message on an in-band control channel CC27 illustrated in FIG. 2;

DESCRIPTION OF PREFERRED EMBODIMENTS

Figure 1:
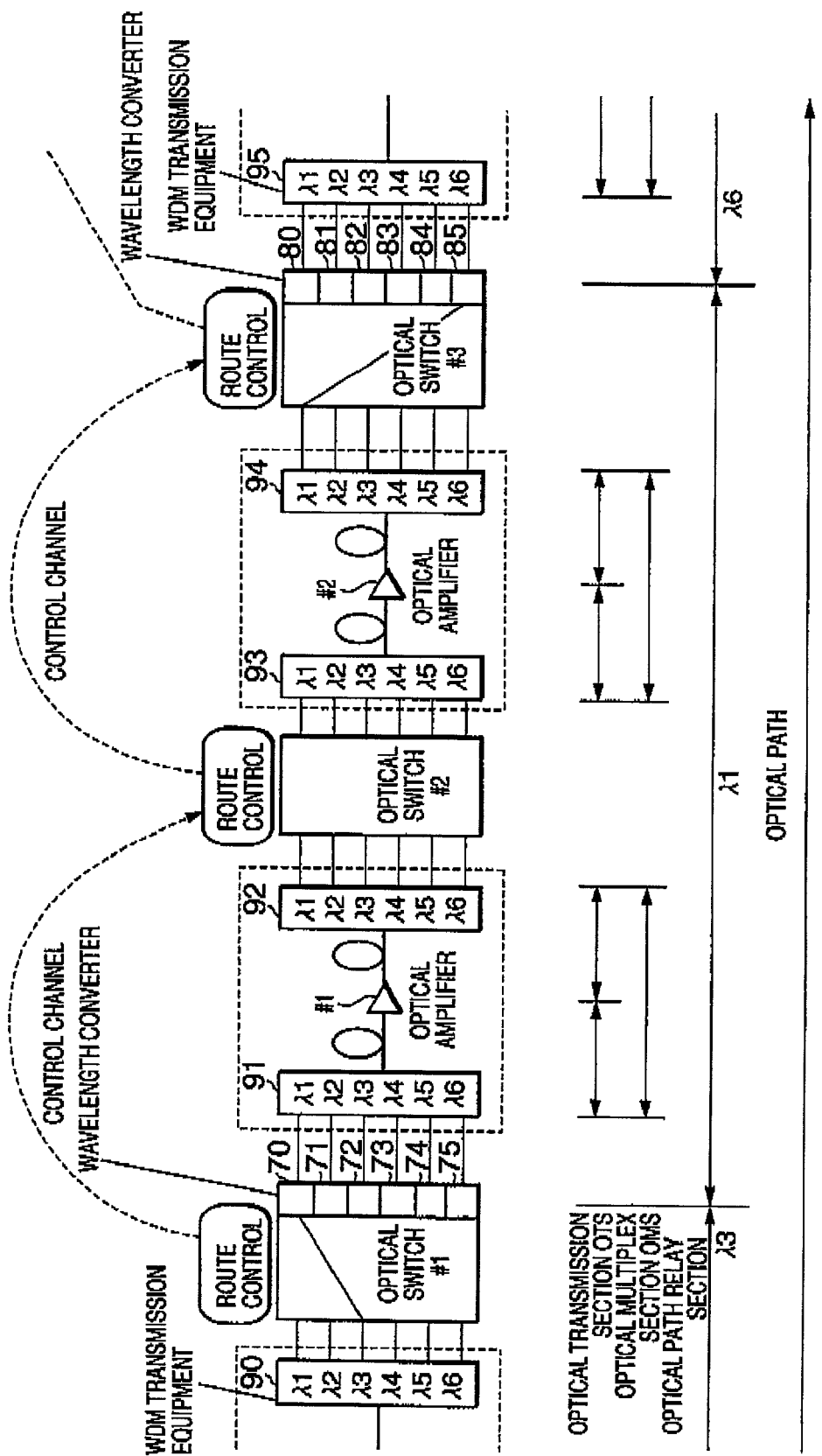
FIG. 1 is a block diagram showing a communication network according to the prior art.
Figure 2:
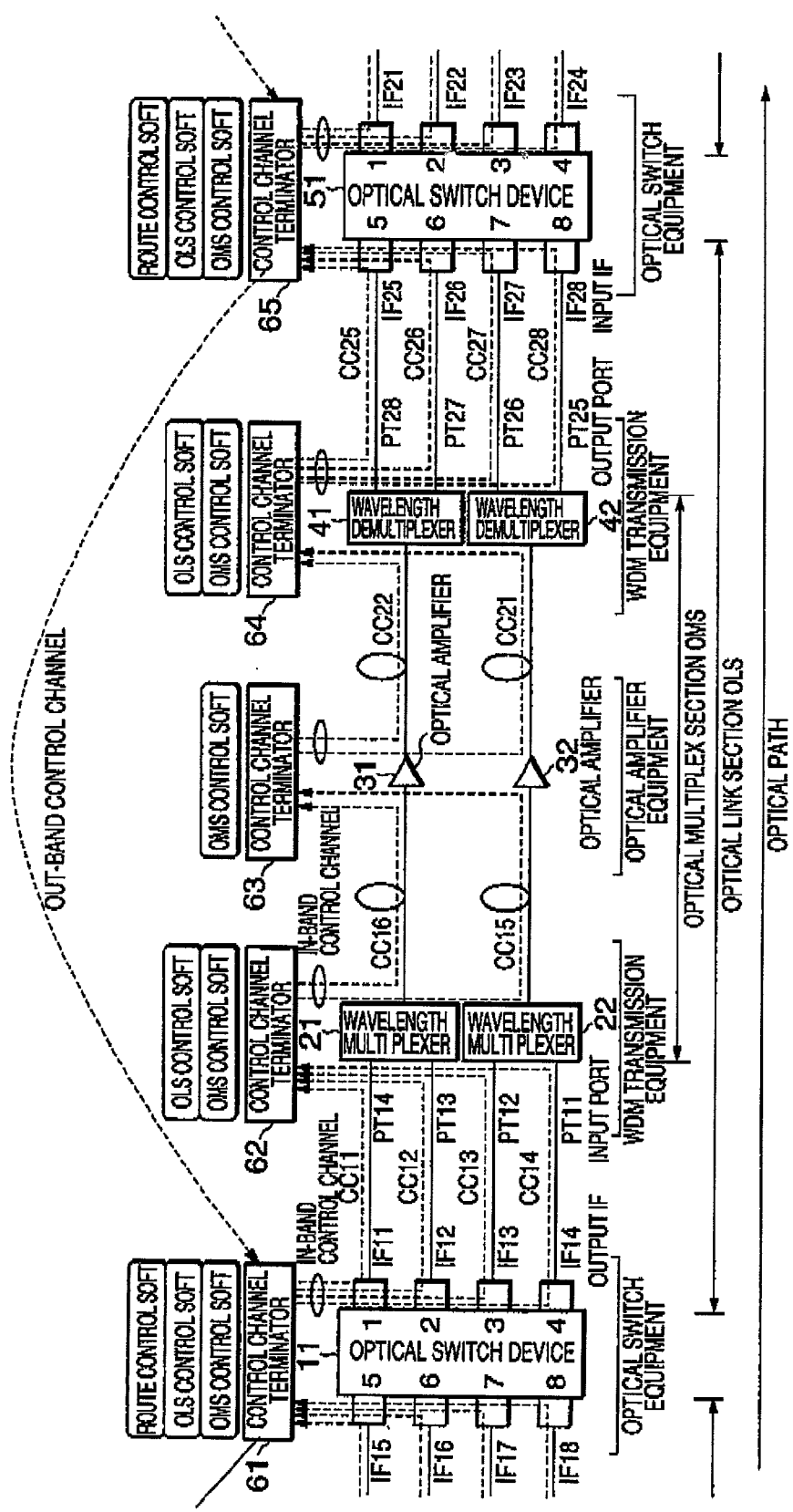
FIG. 2 is a block diagram showing a communication network according to a first embodiment of the invention.

Referring to now FIG. 2, description will be hereinafter made about a first embodiment of this invention. Herein, a communication network according to a first embodiment of the invention is exemplified by a portion of the communication network including two transparent optical switch equipments connected with each other through an optical link, as shown in FIG. 2.

An optical-link-section (OLS) is an administrative hierarchy for administering an optical link between the adjoining optical switch equipments and is defined as a portion between output interfaces (IF) IF11 to IF14 of an optical switch equipment 1 and input interfaces (IF) IF 25 to IF28 of an optical switch equipment 5 and is structured by four optical links. In an optical-multiplex-section (OMS), individual two of the four optical links are wavelength-multiplexed and transmitted by a WDM (Wavelength division multiplex) transmission equipment 2.

Each of the optical switch equipments 1, 5 and the WDM transmission equipments 2, 4 has optical link section control softwares. Between these devices, uni-directional in-band control channels CC11 to CC14 and CC25 to CC28 directed in the same direction as that of the optical path are arranged from the optical switch equipment I to the optical switch equipment 5. The optical multiplex section also includes uni-directional in-band control channels CC15, CC16, CC21 and CC22 in the same direction as that of the optical path. Further, a uni-directional out-band control channel directed in direction opposite to the optical path from the optical switch equipment 5 to the optical switch equipment 1 is arranged so as to connect the optical switch equipments directly.

The above descried communication network includes the optical switch equipments 1, 5, the WDM transmission equipments 2, 4 and an optical amplifier equipment 3. The optical switch equipments 1 and 5 comprise optical switch equipments 11 and 51, control channel terminators (IF) 61 and 65 for exchanging a control message on the in-band control channel, a route control software, an optical link section (OLS) control software and an optical multiplex section (OMS) control software. The WDM transmission equipment 2 has wavelength multiplexers 21 and 22, a control channel terminator 62, an optical link section control software and an optical multiplex section control software. The optical amplifier equipment 3 includes optical amplifiers 31 and 32, a control channel terminator 63 and an optical multiplex section control software. The WDM transmission equipment 4 comprises wavelength demultiplexers 41 and 42, a control channel terminator 64, an optical link section control software and an optical multiplex section control software.

Figure 3:
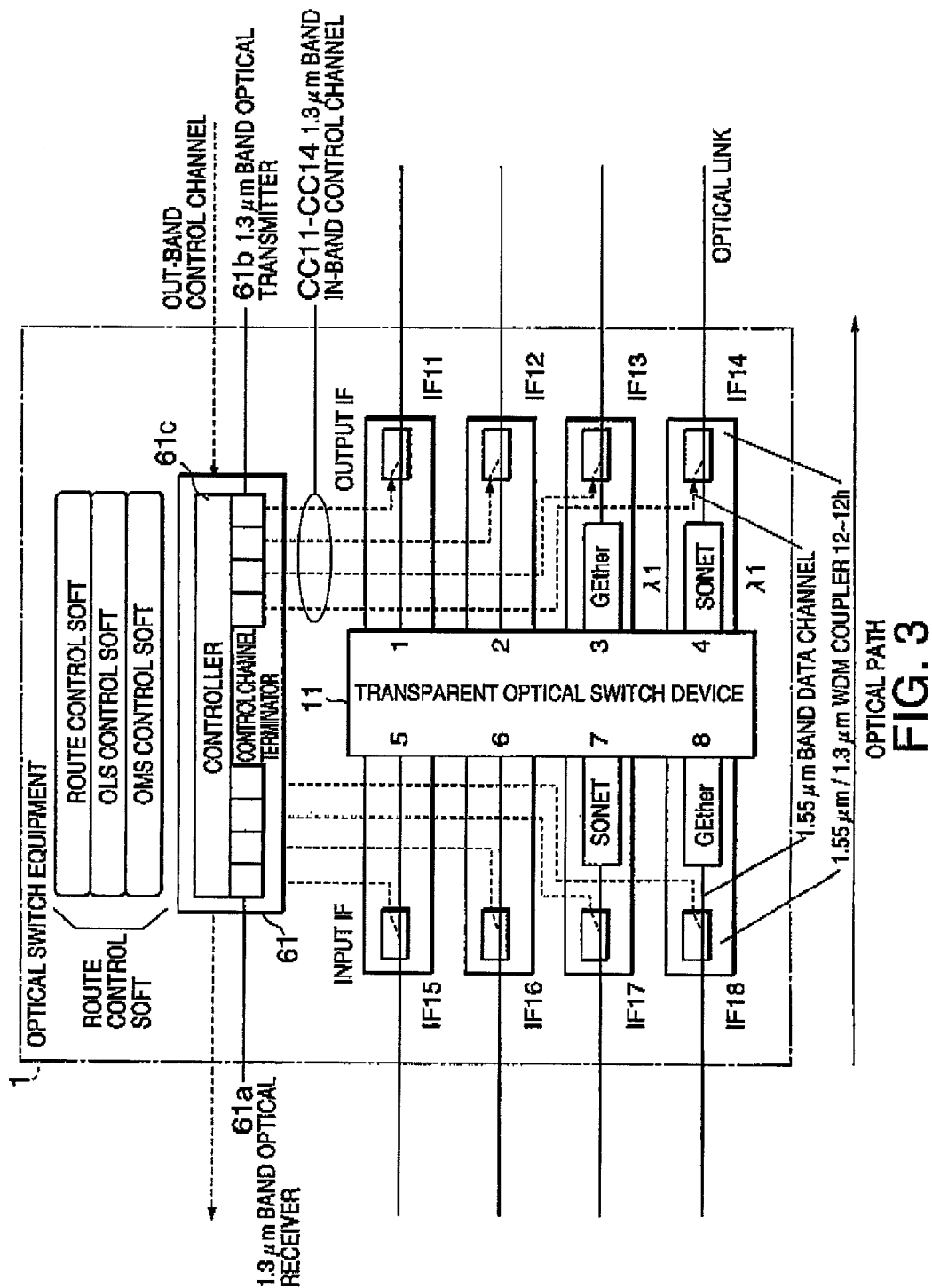
FIG. 3 is a block diagram showing an example of the construction of an optical switch equipment illustrated in FIG. 1.

Referring to FIG. 3, the optical switch equipment includes: the transparent optical switch device 11 structured by a micro-electromechanical-switch (MEMS) or a main-distribution-frame (MDF); the interfaces (input IF and output IF); the control channel terminator 61, a route control software, the optical link section control software and the optical multiplex section control software.

Such an optical switch device 11 can perform general switching of plural wavelengths of signals at an arbitrary signal rate and in an arbitrary signal format. A data channel of 1.55 micron band can be set up on the optical path. The 1.3 micron band is used for the in-band control channel for each optical link to thereby multiplex on and demultiplex from the data channel by the use of 1.55 micron/1.3 micron WDM couplers 12a to 12h.

The input interfaces IF15 and IF16 and the output interfaces IF11 and IF12 can input/output data channels with arbitrary wavelength, signal rate and signal format. For these four interfaces, the optical switch equipment 1 serves as the transparent optical switch equipment.

On the other hand, the input interface IF17 and the output interface IF14 are optical carrier (OC) 48 (2.5 Gbits/s) SONET interfaces with an electric signal processing.

The input interface IF18 and the output interface IF13 are 1 Gbits/s Ethernet (GEther) interfaces with an electric signal processing. In this event, the optical link section control software administers the attributes of the optical link specified by these interfaces as an optical link attribute table.

The control channel terminator 61 comprises a 1.3 micron band optical receiver 61a, a 1.3 micron band optical transmitter 61b connected with the 1.3 micron band in-band control channels CC11 to CC14, and a controller 61c.

Referring to FIG. 4A, the attribute items (values thereof) of the optical link attributes specified by the output interfaces of the optical switch equipment 1 are structured by, for every output interfaces ("IF11", "IF12", "IF13" and "IF14"), an output optical switch No. ("1"), output IF Nos. ("1", "2", "3" and "4"), wavelengths ("arbitrary" and "λ1"), signal rates ("arbitrary", "1 Gbits/s" and "2.5 Gbits/s") and signal formats ("arbitrary", "GEther" and "SONET").

Referring to FIG. 4B, the attribute items (values thereof of the optical link attributes specified by the input interfaces of the optiical switch device 5 are structured by, for the input interfaces ("IF25", "IF26", "IF27" and "IF28"), an input optical switch No. ("5"), input IF Nos. ("5", "6", "7" and "8"), a wavelength ("arbitrary"), signal rates ("arbitrary", "2.5 Gbits/s" and "1 Gbits/s") and signal formats ("arbitrary" "SONET" and "GEther").

Figure 5:
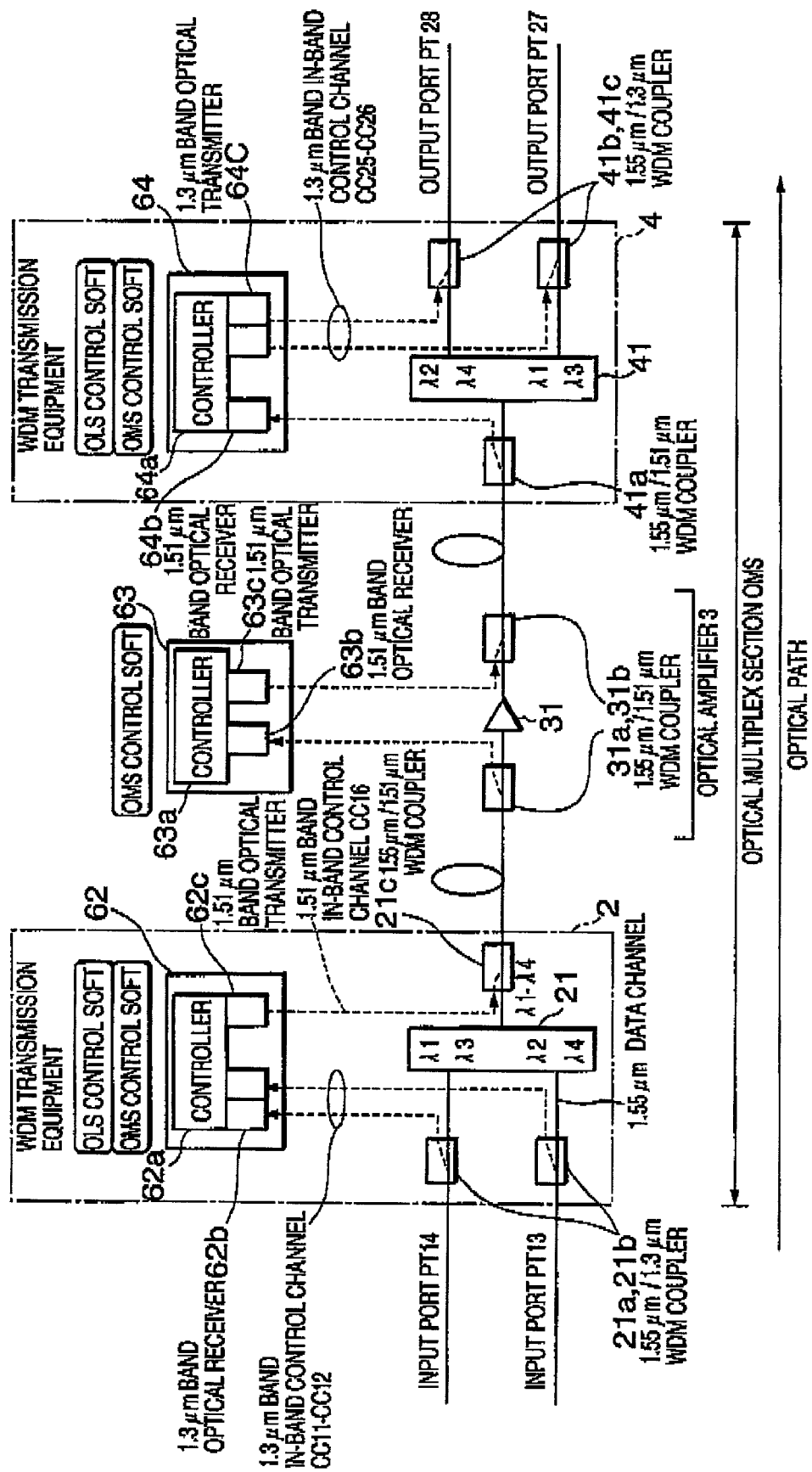
FIG. 5 is a diagram showing an example of an optical multiplex section illustrated in FIG. 2.

Referring to FIG. 5, there is shown the detailed construction of a portion of the optical multiplex section shown in FIG. 2. In the optical multiplex section, as in FIG. 3, the in-band control channels CC11 to CC12 and CC25 to CC26 of each optical link are multiplexed on and demultiplexed from the data channels by using 1.55 micron/1.3 micron WDM couplers 21a, 21b, 41b and 41c. Although not shown, the in-band control channels CC13 to CC14 and CC27 to CC28 are similar to the aforementioned in-band control channels CC11 to CC12 and CC25 to CC26.

The in-band control channels CC16 and CC22 in the optical multiplex section employ a 1.51 micron band and are multiplexed on and demultiplexed from the data channels by using 1.55 micron/1.51 micron WDM couplers 21c, 31a, 31b and 41a. Although not shown, the in-band control channels CC15 and CC21 are similar to the above-mentioned in-band control channels CC16 and CC26.

An input port PT14 connected with the WDM transmission equipment 2 is set up so as to receive signals of wavelengths λ1 and λ3 at a signal rate of 10 Gbits/s or less while an input port PT13 is set up so as to receive signals of λ2 and λ4 at the signal rate of 10 Gbits/s or less. The WDM transmission equipment 2 produces the signal having the wavelengths λ1 to λ4 multiplexed to the optical amplifier 31. This optical amplifier 31 amplifies the input signal to produce for the WDM transmission equipment 4, and the in-band control channel CC16 becomes the in-band control channel CC22 while bypassing the optical amplifier 31. Likewise, the in-band control channel CC15 becomes the in-band control channel CC21 while bypassing the optical amplifier 31.

An output port PT27 connected with the WDM transmission equipment 4 is set up so as to produce the signals of the wavelengths λ1 and λ3, and an output port PT28 is set up so to produce the signals of λ2 and λ4. The optical link section control softwares of the WDM transmission equipments 2 and 4 administer the attributes of the optical links specified by these ports, as the optical link attribute table.

As illustrated in FIG. 5, the WDM transmission equipment 2 comprises the wavelength multiplexer 21, the control channel terminator 62, the optical link section control software and the optical multiplex section control software. The WDM transmission equipment 4 includes the wavelength demultiplexer 41, the control channel terminator 64, the optical link section control software and the optical multiplex section control software. Further, the optical amplifier equipment 3 has the optical amplifier 31, the control channel terminator 63 and the optical multiplex section control software.

Here, the control channel terminator is composed of a controller 62a, a 1.3 micron band optical receiver 62b and a 1.51 micron band optical transmitter 62c. Further, the control channel terminator 63 is structured by a controller 63a, a 1.51 micron band optical receiver 63b and a 1.51 micron band optical transmitter 63c. Moreover, the control channel terminator 64 is constructed of a controller 64a, a 1.51 micron band optical receiver 64b and a 1.3 micron band optical transmitter 64c.

Referring to FIG. 6A, the attribute items (values thereof) of the optical link attributes specified by the input ports of the wavelength multiplexers 21 and 22 are constructed, for every input ports ("PT11", "PT12", "PT13" and "PT14"), of wavelengths ("λ2", "λ1", "λ2, λ4" and "λ1, λ3"), signal rates ("40 Gbits/s or less" and "10 Gbits's or less"), a signal format ("arbitrary"), and optical multiplex section (OMS) group Nos. ("2" and "1").

Referring to FIG. 6B, the attribute items (values thereof) of the optical link attributes specified by the output ports of the WDM transmission equipments 41 and 42 are constructed, for every output ports ("PT25", "PT26", "PT27" and "PT28"), of wavelengths ("λ1", "λ2", "λ1, λ3" and "λ2, λ4"), signal rates ("40 Gbits/s or less" and "10 Gbits/s or less"), a signal format ("arbitrary"), and optical multiplex section (OMS) group Nos. ("2" and "1").

The optical multiplex section group Nos. are the identification numbers of the optical link groups which are multiplexed by the WDM transmission equipments 2 and 4 and are transmitted on the common optical fibers via the optical amplifiers 31 and 32.

Referring to FIGS. 7A to 7D, there are shown the control messages which are transmitted on the in-band control channel from the optical switch equipment 1→the OMS.

FIG. 7A shows the control message on the in-band control channel CC11 (i.e., the output interface IF11→the input port PT14); FIG. 7B shows the control message on the in-band control channel CC12 (i.e., the output interface IF12→the input port PT13); FIG. 7C shows the control message on the in-band control channel CC13 (i.e., the output interface IF13→the input port PT12); and FIG. 7D shows the control message on the in-band control channel CC14 (i.e., the output interface IF14→the input port PT11).

In FIG. 7A, the attribute items (values thereof stored in the control message on the in-band control channel CC11 are an output optical switch No. ("1"), an output IF No. ("1"), a wavelength ("arbitrary"), a signal rate ("arbitrary") and a signal format ("arbitrary").

In FIG. 7B, the attribute items (values thereof) stored in the control message on the in-band control channel CC12 are an output optical switch No. ("1"), an output IF No. ("2"), a wavelength ("arbitrary"), a signal rate ("arbitrary") and a signal format ("arbitrary").

In FIG. 7C, the attribute items (values thereof) stored in the control message on the in-band control channel CC13 are an output optical switch No. ("1"), an output IF No. ("3"), a wavelength ("λ1"), a signal rate ("1 Gbits/s") and a signal format ("GEther").

In FIG. 7D, the attribute items (values thereof) stored in the control message on the in-band control channel CC14 are an output optical switch No. ("1"), an output IF No. ("4"), a wavelength ("λ1"), a signal rate ("2.5 Gbitsls") and a signal format ("SONET").

Referring to FIGS. 8A and 8B, there is shown the control message to be transmitted on the in-band control channel in the optical multiplex section (OMS). FIG. 8A shows the control message on the in-band control channels CC16 and CC22 (i.e., the input ports PT14 and PT13→the output ports PT27 and PT28), and FIG. 8B shows the control message on the in-band control channels CC15 and CC21 (i.e., the input ports PT12 and PT11→the output ports PT25 and PT26).

In FIG. 8A, the attribute items (values thereof) stored in the control message on the in-band control channels CC16 and CC22 are an output optical switch No. ("1"), output IF Nos. ("1" and "2"), wavelengths ("λ1, λ3" and "λ4"), a signal rate ("≦10 Gbits/s"), a signal format ("arbitrary") and an optical multiplex section (OMS) group No. ("1").

In FIG. 8B, the attribute items (values thereof) stored in the control message on the in-band control channels CC15 and CC21 are an output optical switch No. ("1"), output IF Nos. ("3" and "4"), wavelengths ("λ1" and "error"), signal rates ("1 Gbits/s" and "2.5 Gbits/s"), signal formats ("GEther" and "SONET") and an optical multiplex section group No. ("2").

Referring to FIGS. 9A to 9D, there are shown the control messages which are transmitted on the in-band control channel from the optical multiplex section (OMS)→the optical switch equipment 5.

FIG. 9A shows the control message on the in-band control channel CC26 (i.e., the output port PT27→the input interface IF26); FIG. 9B shows the control message on the in-band control channel CC25 (i.e., the output port PT28→the input interface IF25); FIG. 5C shows the control message on the in-band control channel CC28 (i.e., the output port PT25→the input interface IF28); and FIG. 9D shows the control message on the in-band control channel CC27 (i.e., the output port PT26→the input interface IF27).

In FIG. 9A, the attribute items (and their values) stored in the control message on the in-band control channel CC26 are an output optical switch No. ("1"), an output IF No. ("1"), wavelengths ("λ1, λ3"), a signal rate ("≦10 Gbits/s"), a signal format ("arbitrary") and an optical multiplex section (OMS) group No. ("1").

In FIG. 9B, the attribute items (values thereon stored in the control message on the in-band control channel CC25 are an output optical switch No. ("1"), an output IF No. ("2"), wavelengths ("λ2, λ4"), a signal rate ("≦10 Gbits/s"), a signal format ("arbitrary") and an optical multiplex section (OMS) group No. ("1")

In FIG. 9C, the attribute items (values thereof) stored in the control message on the in-band control channel CC28 are an output optical switch No. ("1"), an output IF No. ("3"), a wavelength ("λ1"), a signal rate ("1 Gbits/s"), a signal format ("GEther") and an optical multiplex section group No. ("2").

In FIG. 9D, the attribute items (values thereof stored in the control message on the in-band control channel CC27 are an output optical switch No. ("1"), an output IF No. ("4"), a wavelength ("error"), a signal rate ("2.5 Gbits/s"), a signal format ("SONET") and an optical multiplex section group No. ("2").

Figures 10, 11:
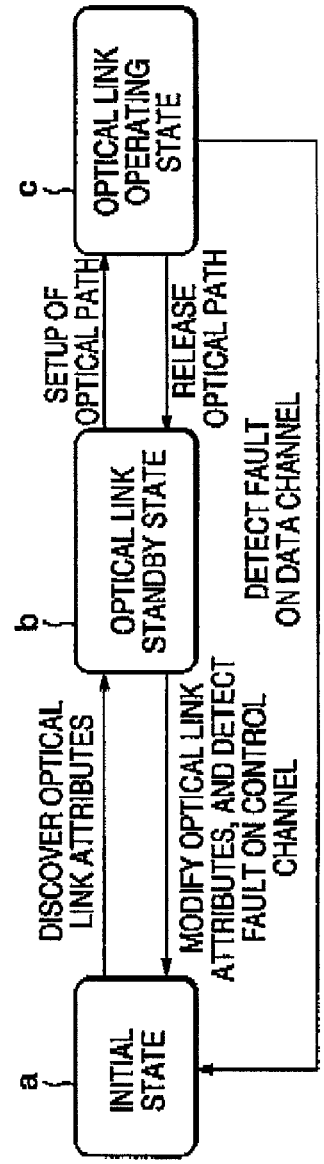
FIG. 10 is a diagram showing an example of a control message to be transmitted from the optical switch equipment to the optical switch equipment illustrated in FIG. 2.
FIG. 11 is a diagram showing an example of the state transitions of an optical link according to a first embodiment of the invention.

Referring to FIG. 10, there is shown the control message which is transmitted on the out-band control channel from the optical switch equipment 5→ the optical switch equipment 1.

In FIG. 10, the attribute items (values thereof stored in this control message are an output optical switch No. ("1"), output IF Nos. ("1", "2", "3" and "4"), wavelengths ("λ1, λ3", "λ2, λ4, λ1" and "error"), signal rates ("≦10 Gbits/s", "1 Gbits/s" and "2.5 Gbitsts"), signal formats ("arbitrary", "GEther" and "SONET"), optical multiplex section (OMS) group Nos. ("1" and "2"), an input optical switch No. ("2") and input IF Nos. ("6", "5", "8" and "7").

With reference to FIGS. 2 to 13, description will be made about the actions for automatically discovering the attributes of the optical link of the communication network according to the first embodiment of the invention and the actions for administering the state at the unit of optical link.

The individual optical links are initialized (as referred to "a" of FIG. 11) (at Step S1 of FIG. 12) just after ON and are transited to the standby state (as referred to "b" of FIG. 11) (at Step S10 of FIG. 12) if the discovery of their attributes is succeeded in the following procedure.

Subsequently, the optical link attribute table (as referred to FIG. 4) administered by the optical link section control software of the optical switch equipment 1 is transmitted for each optical link from the output interfaces IF11 to IF14 to the WDM transmission equipment 2 of the optical multiplex section via the in-band control channels CC11 to CC14 (at Step S2 of FIG. 11). In FIGS. 7A to 7D, there are shown the contents of the control message which is stored with the attribute items of the optical link attribute table and their values.

Figure 12:
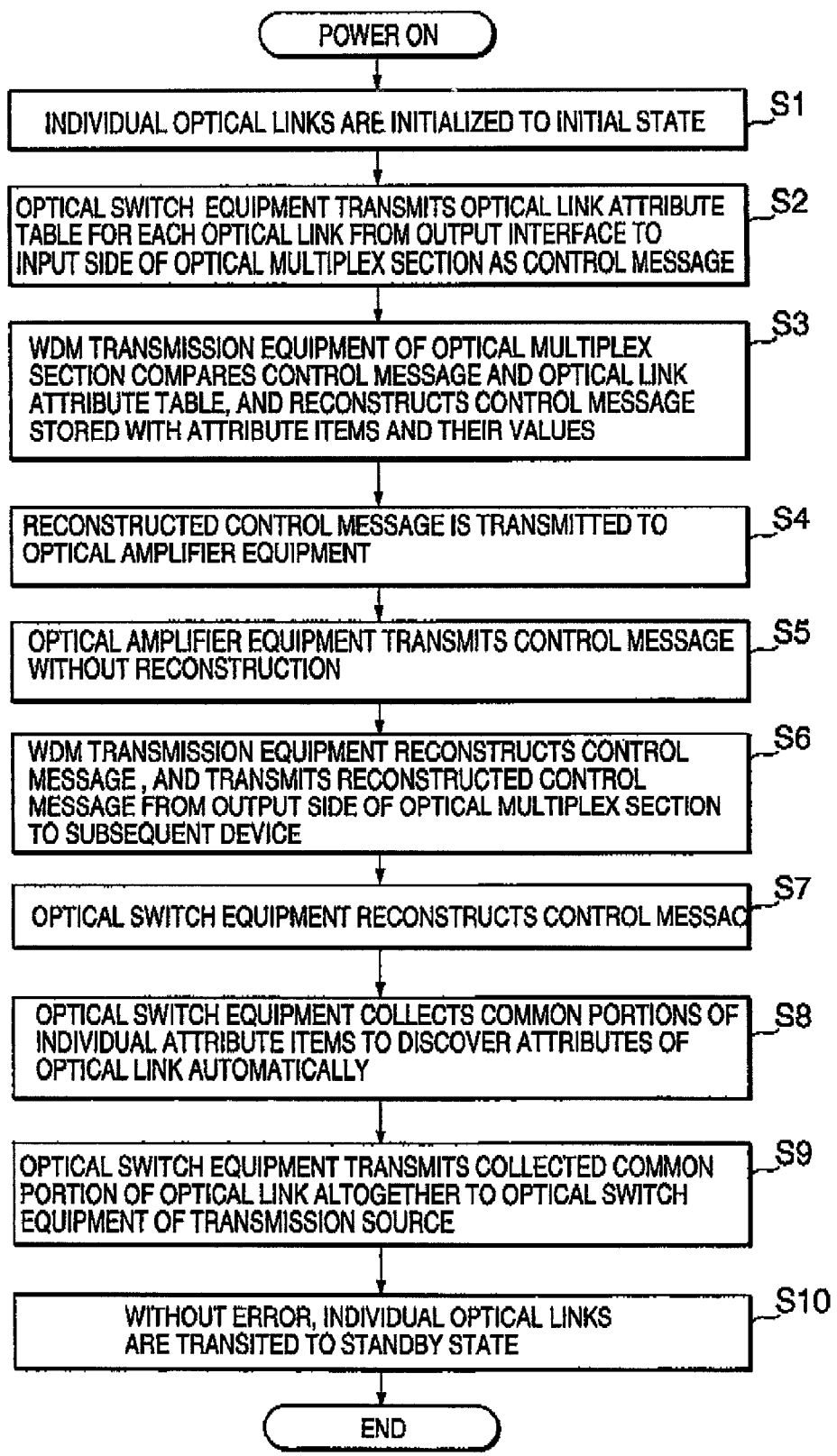
FIG. 12 is a flow chart showing actions of a communication network according to a first embodiment of the invention.

When the WDM transmission equipment 2 of the optical multiplex section receives the control message, it compares the control message with the optical link attribute table (as referred to FIG. 6) administered by its own optical link section control software, and reconstructs a control message stored with the attribute items and their values (at Step S3 of FIG. 12). The control message reconstructed is further transmitted to the optical amplifier equipment 3 via the in-band control channels CC15 and CC16 (at Step S4 of FIG. 12).

The following three steps are done in the procedure of the reconstruction of the control message. In the first case where a new attribute item other than those of the received control message exists in the optical link attribute table of the device itself (at Step S11 of FIG. 13), the attribute items and their values are added therein (at Step S12 of FIG. 13). As a result, the optical multiplex section group No. is added to the control message.

In the second case where an overlapping attribute item exists between the optical link attribute table of the device itself and the received control message (at Step S13 of FIG. 13), it is decided (at Step S14 of FIG. 13) by computing whether or not common portions are in the values of the overlapping attribute items. If this answer is YES, the values of the overlapping attribute items are updated to the values of the common portions (at Step S15 of FIG. 13). As a result, the wavelengths, the signal rates and the signal formats are restricted to the narrower ones.

Figure 13:
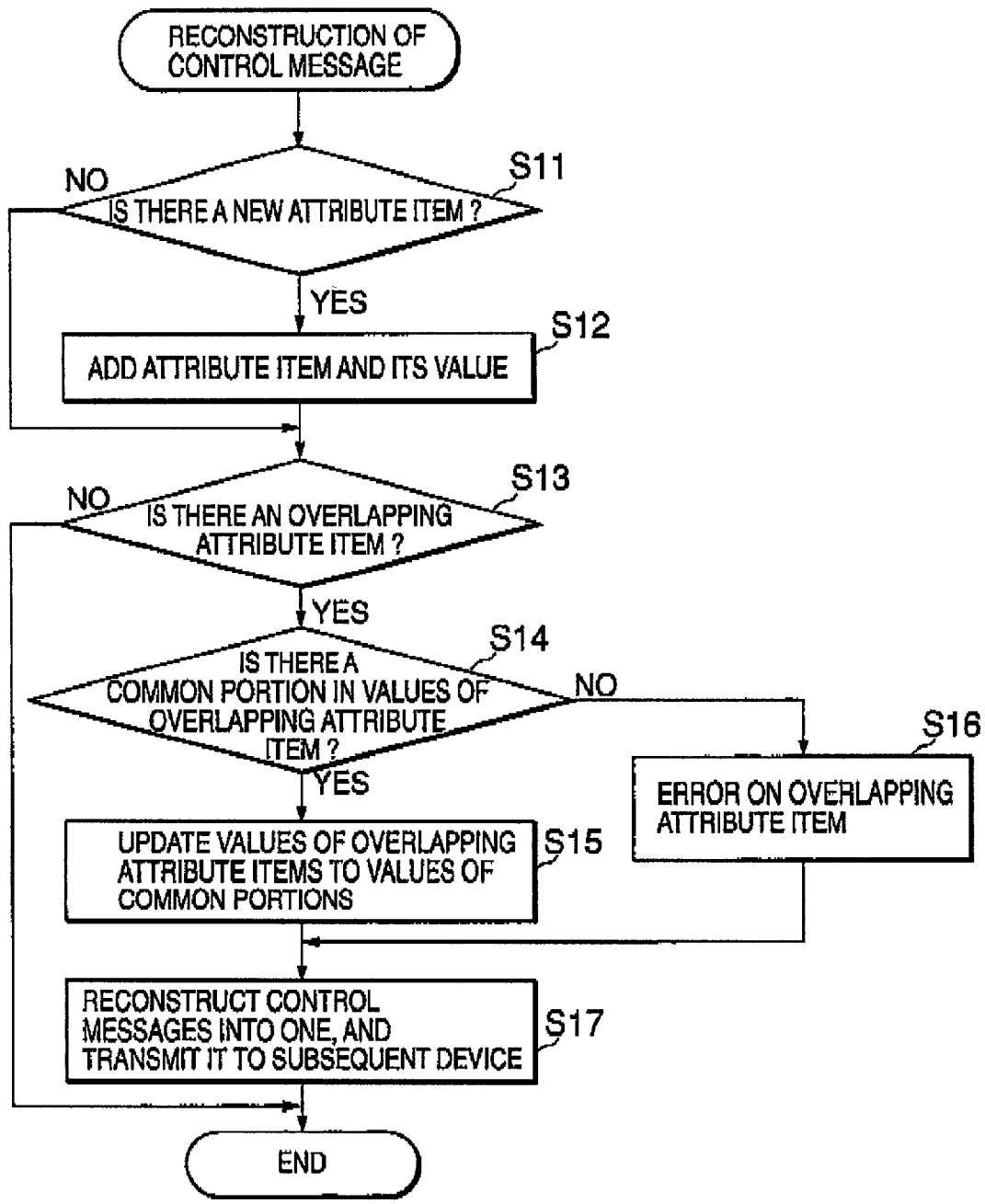
FIG. 13 is a flow chart showing actions of a WDM transmission equipment illustrated in FIG. 2.

On the contrary, in case of no common portion (at Step S14 of FIG. 13), the optical link makes an error upon the attribute items so that it cannot be transited to the standby state (at Step S16 of FIG. 13).

In the third case, the plurality of control messages for the individual optical links to be multiplexed are multiplexed to one (at Step S15 of FIG. 13) just as the optical links are multiplexed by the wavelength multiplexers 21 and 22. FIG. 8 shows the contents of the control messages to be transmitted on the in-band control channels CC15 and CC16 in the optical multiplex section. The error on the aforementioned attribute items is also described as the value of the attribute items in the control message, as shown in FIG. 8B.

The optical amplifier equipment 3 has no optical link section control software so that it transmits the control message without being reconstructed to the subsequent optical amplifier equipment (or the subsequent device) at Step S5 of FIG. 12). The WDM transmission equipment 4 and the optical switch equipment 5 having the optical link section control software reconstruct the aforementioned control message (at Steps S6 and S7 of FIG. 12). By referring the control message reconstructed by the optical switch equipment 5, the common portions of all the attribute items of the optical link and their values can be collected from the optical link attribute tables specified by the individual devices, by administering the optical link section control softwares of the optical switch equipments 1, 5 and the WDM transmission equipments 2, 4. As a result, by the transmissions of the aforementioned control messages, the attributes of the optical links common in the optical link attribute table, as specified by the respective devices, can be automatically discovered (at Step 88 of FIG. 12).

The optical switch equipment 5 transmits the collected attributes of the optical link altogether to the optical switch equipment 1 (at Step 89 of FIG. 12). FIGS. 9A to 9D show the contents of the control message to be transmitted on the in-band control channels CC25 to CC28 from the optical multiplex section to the optical switch equipment 5. Moreover, FIG. 10 shows the contents of the control message to be transmitted on the out-band control channel from the optical switch equipment 5 to the optical switch equipment 1.

Here, the error information shown in FIG. 5D can be employed in the route computations and the administrations of the communication network by notifying itself to the (not-shown) optical switch equipment positioned at the previous stage of the optical switch equipment 1 and the (not-shown) administration device of the communication network through the aforementioned control channel.

By the procedure thus far described, the route control software can produce the route table on the basis of the correlations of the optical switch equipments 1 and 5, as derived from the corresponding relation between the output interfaces and the input interfaces contained in the attributes of the optical link automatically discovered by the optical switch equipments 1 and 5.

When the optical link having its attributes discovered is put into the standby state (as referred to "b" of FIG. 11) (at Step S10 of FIG. 12), it is enabled to take the operating state (as referred to "c" of FIG. 11) by set upting the optical path. In case that the attribute items have no common portions in their portions so that the error occurs or in case a fault is detected either in the control channel or in the data channel in the operating state, the optical link is put into the initial state. Consequently, it cannot set up the optical path thereon.

The optical link section control software of the optical switch equipments 1 and 5 administers the state transition at the unit of optical link to decide whether or not the optical path can be set up or released.

By thus defining the optical link section and providing the in-band control channel for each optical link between the optical switch equipments 1 and 5 and the optical multiplex section, the mutual connection relations between the attributes for each optical link and the interfaces of the optical switch equipments 1 and 5 can be autonomously discovered to thereby eliminate the troublesome or erroneous manual setting up of the attributes of the optical link and the route table.

The uni-directional out-band control channel connecting the optical switch equipments 1 and 5 directly, as shown in FIG. 2, can be replaced by a series of out-band control channels in which the control channel terminators adjoining in the direction opposite to the optical link are sequentially connected with each other, while including the control channel terminators 62 to 64 in the optical multiplex section.

Moreover, the out-band control channel is not in uni-directional but may be bi-directional. Another replacement is a bi-directional out-band control channel network in which the control message is transmitted by using the adjoining optical switch equipment Nos. as the destination address to connect the optical switch equipments 1 and 6 with each other.

The in-band control channels shown in FIGS. 3 and 5 can use wavelength bands other than 1.3 micron band and 1.51 micron band. Further, the same 1.55 micron band as that of the data channel can also be used by replacing the WDM couplers 12a to 12h by couplers or 1×2 optical switches and by employing the optical switches in a switching manner. In this case, only the control channel can be employed in the initial state and in the standby state, and only the data channel can be employed in the operating state, but no fault arises in the discovery of the attributes of the optical link and in the state administration at the unit of optical link.

In addition, the aforementioned 1×2 optical switches can also be omitted by connecting the optical transmitter for the control channel with the input interface of the optical switch equipment and by utilizing the switching function of the optical switch equipment to switch the control channel and the data channel.

Still moreover, the functions of the four optical transmitters of the control channels CC11 to CC14, as provided for every four optical links shown in FIG. 3, can be realized, by using one optical transmitter and 1×4 optical switches. In consequence, the 1×4 optical switches are shared among the control channels by switching them for every constant time periods This realization can also be made for the optical receiver.

With reference to FIG. 2, description has been made about the actions to automatically discover the attributes of the optical links of the case where the WDM transmission equipments 2 and 4 and the optical amplifier equipment 3 are arranged between the adjoining optical switch equipments 1 and 5. However, these actions to discover the attributes of the optical links automatically can also be applied to the case that the output interfaces of the optical switch equipment 1 and the input interfaces of the optical switch equipment 5 are connected directly but not through the WDM transmission equipments 2 and 4.

In this case, the control message is transmitted on the control channels, as directly connected between the interfaces of the optical switch equipments 1 and 5, from the optical switch equipment 1 to the adjoining optical switch equipment 5. Not through the WDM transmission equipments 2 and 4, there is neither any attribute that is specified by the optical multiplex section, nor is reconstructed the control message in the optical link section control software. Moreover, these actions to discover the attributes of the optical links automatically can be applied not only between the adjoining switch devices 1 and 5 but also between the optical switch equipment and a client device connected thereto.

The optical switch equipment 1 shown in FIG. 3 uses the transparent optical switch device 11, which can be replaced by a wavelength switch device composed of a plurality of wavelength converters of variable output wavelengths. Further, the optical switch equipment can be exemplified by any device that is packaged with the route control software.

Moreover, an attribute item such as priority may be added to the attribute items of the optical links shown in FIG. 4. For the wavelength, it is possible to employ not only the physical wavelength or frequency value but also a predetermined logical wavelength No.

To the attribute items of the optical links shown in FIG. 6, there can be added the attribute items of kinds due to the distance in the optical multiplex section (e.g., the distance between the WDM transmission equipments 2 and 4) or the characteristics of the optical fibers (e.g., the dispersion or loss). In this case, the addition of the attribute items makes it possible to compute the route of the shortest distance or the minimum loss or to process the disperse compensation. Herein, the interface Nos. and the optical link Nos. of the optical switch equipment and the wavelength Nos. to be transmitted in the optical links may not be limited to those of the examples shown in FIGS. 4A and 4B and FIGS. 6A and 6B.

Figure 14:
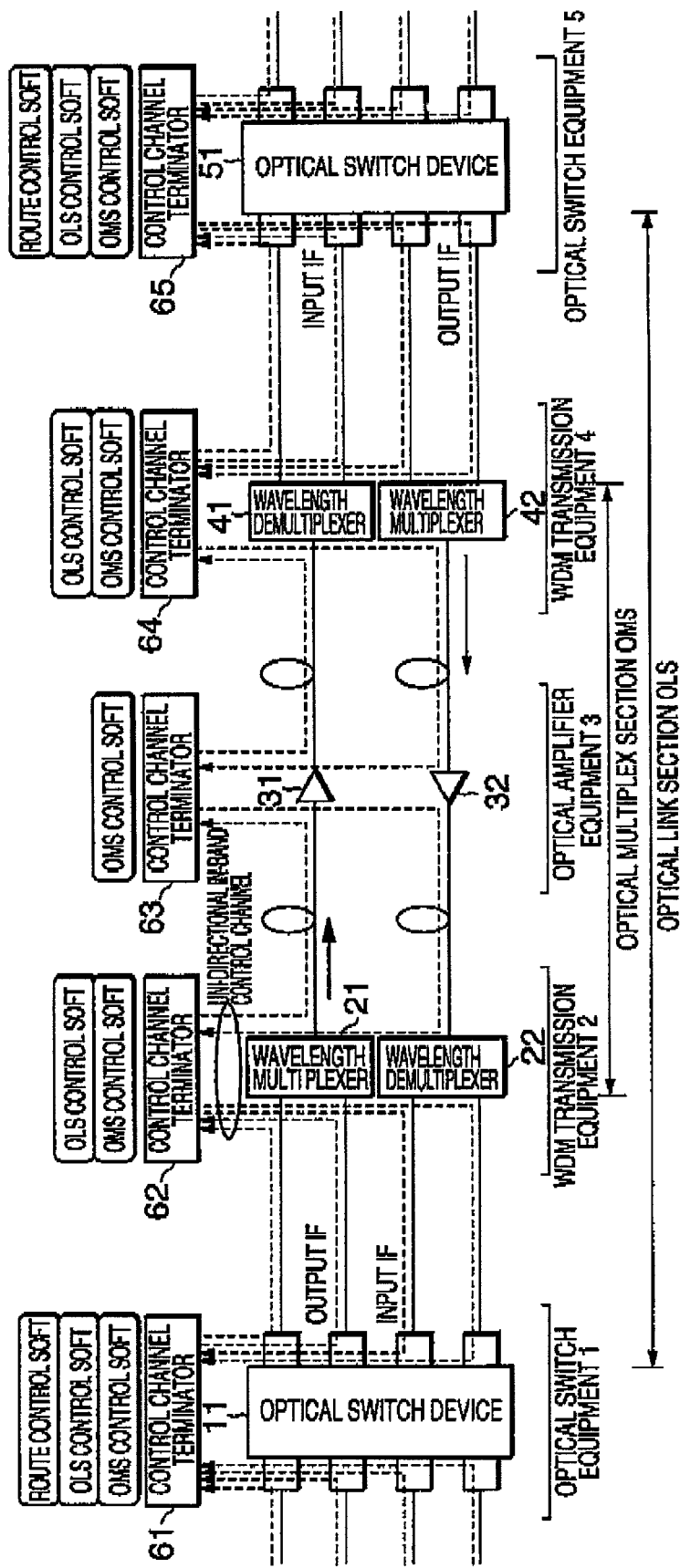
FIG. 14 is a flow chart showing a communication network according to a second embodiment of the invention.

Referring to FIG. 14, description will be made about a second embodiment of the invention. In FIG. 14, the fundamental construction of the communication network according to the second embodiment of the invention is similar to that of the communication network according to the first embodiment of the invention shown in FIG. 2. Therefore, the identical components are designated by the common reference numerals.

The communication network according to the second embodiment of the invention is further devised on the control channels. In the communication network according to the second embodiment of the invention, specifically, bi-directional control channels are constructed of two uni-directional in-band control channels by controlling the upstream and downstream optical links altogether. Consequently, the out-band control channel between the control channel terminators 61 and 65 of the optical switch equipments 1 and 5 shown in FIG. 2 become unnecessary, thus simplifying the construction thereof.

Figure 15:
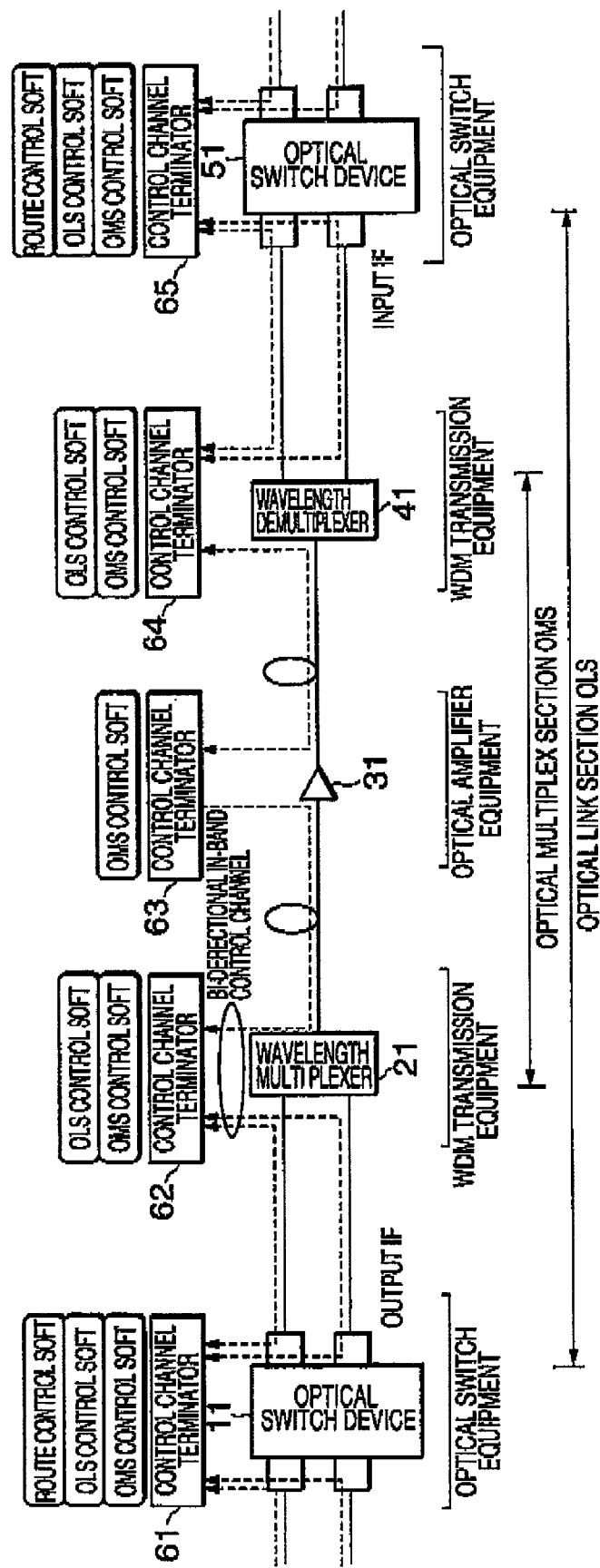
FIG. 15 is a flow chart showing a communication network according to a third embodiment of the invention.

Referring to FIG. 15, description will be made about a third embodiment of this invention. In FIG. 15, the fundamental construction of the communication network according to the third embodiment of the invention is similar to that of the communication network according to the first embodiment of the invention shown in FIG. 2. Therefore, the identical components are designated by the common reference numerals.

The communication network according to the third embodiment of the invention is also further devised on the control channels. In the communication network according to the third embodiment of the invention, specifically, a bi-directional in-band control channel is set up for each optical link. In consequence, the upstream and downstream optical links shown in FIG. 14 need not be controlled altogether. It is possible to achieve the same effect with only the uni-directional optical links as those of the communication network according to the second embodiment of the invention, further simplifying the construction thereof in comparison with the second embodiment of the invention.

Thus, the optical link section is defined, and the in-band control channel for each optical link is provided between the optical switch equipments 1 and 5 and the optical multiplex section. Thereby, the attribute information of the optical links can be mutually exchanged between the optical switch equipments 1 and 5 and between the optical switch equipments 1 and 5 and the optical multiplex section. Therefore, the attributes of each optical link and the mutual connection relations between the interfaces of the optical switch equipments 1 and 6 can be autonomously discovered to administer the state at the unit of optical link and to eliminate the troublesome or erroneous manual setting of the attributes of the optical links or the route table.

According to this invention, as has been described hereinbefore, in the communication network including the plurality of optical switch equipments connected with each other through the WDM transmission equipments, the optical link section is defined from the output interfaces of the first optical switch equipment of the transmission source to the input interfaces of the adjoining second optical switch equipment. Between the first and second optical switch equipments and the optical multiplex section, there are provided for the individual optical links the in-band control channels, through which the optical link attributes specified by the interfaces of the first and second optical switch equipments and the optical link attributes specified by the optical multiplex section are mutually exchanged as the control messages. In case at least one of the adjoining two optical switch equipments corresponds to the transparent optical switch equipment, therefore, the attributes of the optical links leading from the output interfaces of the optical switch equipment to the input interfaces of the adjoining optical switch equipment and the mutual connection relates between the interfaces of the optical switch equipments can be autonomously discovered to produce the route table automatically thereby to administer the state at the unit of optical link.

While this invention has thus far been disclosed in conjunction with several embodiments thereof, it will be readily possible for those skilled in the art to put this invention into practice in various other manners.

What is claimed is:

1. A communication network having a plurality of optical communication devices connected with each other, comprising:

uni-directional in-band control channels provided in every optical links leading from the output interfaces of one of adjoining first and second optical communication devices to the input interfaces of the other of the first and second optical communication devices, between the interfaces of the first and second optical communication devices along and for the every optical links; and an out-band control channel provided between the first and second optical communication devices, wherein the first and second optical communication devices include: control channel terminators for terminating the uni-directional in-band control channels and the out-band control channel; and optical link controllers for administering the every optical links by exchanging control messages through the control channel terminators, wherein the optical link controllers:

administer individual optical link attribute tables for specifying the attribute items of the optical links and their attribute values individually for the every optical links;

discover the attributes of the optical links by storing the individual optical link attribute tables in the control messages and exchanging them mutually, by comparing the attribute values for the every attribute items of the individual optical link attribute tables, and by collecting the common portions of the attribute values;

set up the optical links, of which the discovery of the attributes has failed, in an initial state;

set up the optical links, of which the discovery of the attributes has succeeded, in an usable state; and set up the optical links, of which no common portion of the attribute values has existed so that the discovery of the attributes has failed, as an error in an unusable state, thereby to perform the state administrations for the every optical links.

2. A communication network according to claim 1, wherein the optical link attribute tables to be administered by the optical link controllers include a device No., an interface No., a wavelength, a signal rate and a signal format or physical characteristics of optical fibers constructing the optical links as the attribute items of the optical links.

3. A communication network according to claim 1, wherein the attributes of the optical links, which have been discovered by collecting the common portions of the attribute items of the optical link attribute tables administered by the optical link controllers, include an output device No., an output interface No., a wavelength, a signal rate, a signal format, an input device No., an input interface No., or physical characteristics of optical fibers constructing the optical links as the attribute items.

4. A communication network having a plurality of optical communication devices connected with each other, comprising:

a first uni-directional in-band control channel provided in every downstream optical links leading from the output interfaces of one of adjoining first and second optical communication devices to the input interfaces of the other of the first and second optical communication devices, between the interfaces of the first and second optical communication devices along and for the every downstream optical links; and a second uni-directional in-band control channel provided in every upstream optical links leading from the output interfaces of the other of the first and second optical communication devices to the input interfaces of the one of the first and second optical communication devices, between the interfaces of the first and second optical communication devices along and for the every upstream optical links and directed in the direction opposite to the control channel in the downstream optical links, wherein the first and second optical communication devices include: control channel terminators for terminating the first and second uni-directional in-band control channels, respectively; and optical link controllers for administering the every optical links by exchanging control messages through the control channel terminators, wherein the optical link controllers:

administer individual optical link attribute tables for specifying the attribute items of the optical links and their attribute values individually for the every optical links;

discover the attributes of the optical links by storing the individual optical link attribute tables in the control messages and exchanging them mutually, by comparing the attribute values for the every attribute items of the individual optical link attribute tables, and by collecting the common portions of the attribute values;

setup the optical links, of which the discovery of the attributes has failed, in an initial state;

set up the optical links, of which the discovery of the attributes has succeeded, in an usable state; and set up the optical links, of which no common portion of the attribute values has existed so that the discovery of the attributes has failed, as an error in an unusable state, thereby to perform the state administrations for the every optical links.

5. A communication network according to claim 4, wherein the optical link attribute tables to be administered by the optical link controllers include a device No., an interface No., a wavelength, a signal rate and a signal format or physical characteristics of optical fibers constructing the optical links as the attribute items of the optical links.

6. A communication network according to claim 4, wherein the attributes of the optical links, which have been discovered by collecting the common portions of the attribute items of the optical link attribute tables administered by the optical link controllers, include an output device No., an output interface No., a wavelength, a signal rate, a signal format, an input device No., an input interface No., or physical characteristics of optical fibers constructing the optical links as the attribute items.

7. A communication network having a plurality of optical communication devices connected with each other, comprising:

a bi-directional in-band control channel provided in every optical links leading from the output interfaces of one of adjoining first and second optical communication devices to the input interfaces of the other of the first and second optical communication devices, between the interfaces of the first and second optical communication devices along and for the every optical links, wherein the first and second optical communication devices include: a control channel terminator for terminating the bi-directional in-band control channels; and optical link controllers for administering the every optical links by exchanging control messages through the control channel terminators, wherein the optical link controllers:

administer individual optical link attribute tables for specifying the attribute items of the optical links and their attribute values individually for the every optical links;

discover the attributes of the optical links by storing the individual optical link attribute tables in the control messages and exchanging them mutually, by comparing the attribute values for the every attribute items of the individual optical link attribute tables, and by collecting the common portions of the attribute values;

set up the optical links, of which the discovery of the attributes has failed, in an initial state;

set up the optical links, of which the discovery of the attributes has succeeded, in an usable state; and set up the optical links, of which no common portion of the attribute values has existed so that the discovery of the attributes has failed, as an error in an unusable state, thereby to perform the state administrations for the every optical links.

8. A communication network according to claim 7, wherein the optical link attribute tables to be administered by the optical link controllers include a device No., an interface No., a wavelength, a signal rate and a signal format or physical characteristics of optical fibers constructing the optical links as the attribute items of the optical links.

9. A communication network according to claim 7, wherein the attributes of the optical links, which have been discovered by collecting the common portions of the attribute items of the optical link attribute tables administered by the optical link controllers, include an output device No., an output interface No., a wavelength, a signal rate, a signal format, an input device No., an input interface No., or physical characteristics of optical fibers constructing the optical links as the attribute items.

10. A communication network having a plurality of optical communication devices connected with each other through WDM transmission equipments, comprising:
a first uni-directional in-band control channel provided in every optical links leading from the output interfaces of one of first and second optical communication devices, which adjoin each other through an optical multiplex section including at least one set of opposed WDM transmission equipments and an arbitrary number of optical amplifiers between the opposed WDM transmission equipments, to the input interfaces of the other of the first and second optical communication devices through the optical multiplex section, between the interfaces of the first and second optical communication devices and the ports of the WDM transmission equipments connected with the interfaces, along and for the every optical links;
a second uni-directional in-band control channel provided in the optical multiplex section between the output ports of one of the opposed WDM transmission equipments and the input ports of the other, along the optical links;
and an out-band control channel provided between the first and second optical communication devices,
wherein the first and second optical communication devices include: control channel terminators for terminating the first uni-directional in-band control channels and the out-band control channel; and optical link controllers for administering the every optical links by exchanging control messages through the control channel terminators, and
wherein the opposed WDM transmission equipments include; control channel terminators for terminating the first and second uni-directional in-band control channels; and optical link controllers for administering the every optical links by exchanging control messages through the control channel terminators.

11. A communication network according to claim 10, wherein at least one of the first and second optical communication devices is an optical switch equipment which is constructed to use a transparent optical switch.

12. A communication network according to claim 10, wherein: the signal wave band of the data channel on the optical links and the signal wave band of the uni-directional in-band control channels are different, and the interfaces of the first and second optical communication devices and the ports of the opposed WDM transmission equipments include WDM couplers for demultiplexing/multiplexing the two different wave bands in all the optical links.

13. A communication network according to claim 12, wherein in any of optical transmitters and optical receivers for transmitting control messages to the uni-directional in-band control channels, 1×N (N: a positive integer) optical switches connected with either one optical transmitter or one optical receiver are switched at a predetermined time interval to time-division share either the optical transmitter or the optical receiver among the N uni-directional control channels.

14. A communication network according to claim 10, wherein: the signal wave band of the data channel on the optical links and the signal wave band of the uni-directional in-band control channels are identical, the interfaces of the first and second optical communication devices and the ports of the opposed WDM transmission equipments include 1× 2 optical switches provided in all optical links, and the optical links are employed as data channels during the data transmission and as control channels at other times by switching the 1×2 optical switches.

15. A communication network according to claim 14, wherein in any of optical transmitters and optical receivers for transmitting control messages to the uni-directional in-band control channels, 1×N (N: a positive integer) optical switches connected with either one optical transmitter or one optical receiver are switched at a predetermined time interval to time-division share either the optical transmitter or the optical receiver among the N uni-directional control channels.

16. A communication network according to claim 10,
wherein the individual optical link controllers of the first and second optical communication devices and the opposed WDM transmission equipments:
administer individual optical link attribute tables for specifying the attribute items of the optical links and their attribute values individually for the every optical links;
discover the attributes of the optical links by storing the individual optical link attribute tables in the control messages and exchanging them mutually, by comparing the attribute values for the every attribute items of the individual optical link attribute tables, and by collecting the common portions of the attribute values;
set up the optical links, of which the discovery of the attributes has failed, in an initial state;
set up the optical links, of which the discovery of the attributes has succeeded, in an usable state; and
set up the optical links, of which no common portion of the attribute values has existed so that the discovery of the attributes has failed, as an error in an unusable state, thereby to perform the state administrations for the every optical links.

17. A communication network according to claim 16, wherein the optical link attribute tables to be administered by the optical link controllers on the first and second optical communication devices include an optical switch equipment No., an interface No., a wavelength, a signal rate, a signal format, a distance between the opposed WDM transmission equipments in the optical multiplex section or physical characteristics of optical fibers constructing the optical links as the attribute items of the optical links.

18. A communication network according to claim 16, wherein the optical link attribute tables to be administered by the optical link controllers on the WDM transmission equipments include a wavelength, a signal rate, a signal format, an optical multiplex section group No., a distance between the opposed WDM transmission equipments in the optical multiplex section or physical characteristics of optical fibers constructing the optical links as the attribute items of the optical links.

19. A communication network according to claim 16, wherein the attributes of the optical links, which have been discovered by collecting the common portions of the attribute items of the optical link attribute tables administered by the optical link controllers, include an output optical switch equipment No., an output interface No., a wavelength, a signal rate, a signal format, an optical multiplex section group No., an input optical switch equipment No., a distance between the opposed WDM transmission equipments in the optical multiplex section or physical characteristics of optical fibers constructing the optical links as the attribute items.

20. A communication network having a plurality of optical communication devices connected with each other through WDM transmission equipments, comprising:

a first uni-directional in-band control channel provided in every downstream optical links leading from the output interfaces of one of first and second optical communication devices, which adjoin each other through an optical multiplex section including at least one set of opposed WDM transmission equipments for transmitting downstream and upstream signals individually and an arbitrary number of optical amplifiers between the opposed WDM transmission equipments, to the input interfaces of the other of the first and second optical communication devices through the optical multiplex section, between the interfaces of the first and second optical communication devices and the ports of the WDM transmission equipments connected with the interfaces, along and for the every downstream optical links, a second uni-directional in-band control channel provided in the optical multiplex section between the output ports of one of the opposed WDM transmission equipments for transmitting the downstream signals and the input ports of the other, along the downstream optical links;

a third uni-directional in-band control channel provided in every upstream optical links leading from the output interfaces of the other optical communication device of the first and second optical communication devices through the optical multiplex section to the input interfaces of the one optical communication device of the first and second optical communication devices, between the interfaces of the first and second optical communication devices and the ports of the WDM transmission equipment connected with the interfaces, along and for the every upstream downstream optical links and directed in the direction opposite to the control channels in the downstream optical links; and a fourth uni-directional in-band control channel provided in the optical multiplex section between the output ports of one of the opposed WDM transmission equipments for transmitting the upstream signals and the input ports of the other and directed in the direction opposite to the control channels in the downstream optical links, along the upstream optical links, wherein the first and second optical communication devices include: control channel terminators for terminating the first and third uni-directional in-band control channels; and optical link controllers for administering the every optical links by exchanging control messages through the control channel terminators, wherein the opposed WDM transmission equipments for transmitting the downstream signals include: control channel terminators for terminating the first and second uni-directional in-band control channels; and optical link controllers for administering the every optical links by exchanging control messages through the control channel terminators, and wherein the opposed WDM transmission equipments for transmitting the upstream signals include: control channel terminators for terminating the third and fourth uni-directional in-band control channels; and optical link controllers for administering the every optical links by exchanging control messages through the control channel terminators.

21. A communication network according to claim 20, wherein at least one of the first and second optical communication devices is an optical switch equipment which is constructed to use a transparent optical switch.

22. A communication network according to claim 20, wherein: the signal wave band of the data channel on the optical links and the signal wave band of the uni-directional in-band control channels are different, and the interfaces of the first and second optical communication devices and the ports of the opposed WDM transmission equipments include WDM couplers for demultiplexing/multiplexing the two different wave bands in all the optical links.

23. A communication network according to claim 22, wherein in any of optical transmitters and optical receivers for transmitting control messages to the uni-directional in-band control channels, 1×N (N: a positive integer) optical switches connected with either one optical transmitter or one optical receiver are switched at a predetermined time interval to time-division share either the optical transmitter or the optical receiver among the N uni-directional control channels.

24. A communication network according to claim 20, wherein: the signal wave band of the data channel on the optical links and the signal wave band of the uni-directional in-band control channels are identical, the interfaces of the first and second optical communication devices and the ports of the opposed WDM transmission equipments include 1×2 optical switches provided in all optical links, and the optical links are employed as data channels during the data transmission and as control channels at other times by switching the 1×2 optical switches.

25. A communication network according to claim 24, wherein in any of optical transmitters and optical receivers for transmitting control messages to the uni-directional in-band control channels, 1×N (N: a positive integer) optical switches connected with either one optical transmitter or one optical receiver are switched at a predetermined time interval to time-division share either the optical transmitter or the optical receiver among the N uni-directional control channels.

26. A communication network according to claim 20, wherein the individual optical link controllers of the first and second optical communication devices and the opposed WDM transmission equipments: administer individual optical link attribute tables for specifying the attribute items of the optical links and their attribute values individually for the every optical links; discover the attributes of the optical links by storing the individual optical link attribute tables in the control messages and exchanging them mutually, by comparing the attribute values for the every attribute items of the individual optical link attribute tables, and by collecting the common portions of the attribute values; set up the optical links, of which the discovery of the attributes has failed, in an initial state; set up the optical links, of which the discovery of the attributes has succeeded, in an usable state; and set up the optical links, of which no common portion of the attribute values has existed so that the discovery of the attributes has failed, as an error in an unusable state, thereby to perform the state administrations for the every optical links.

27. A communication network according to claim 26, wherein the optical link attribute tables to be administered by the optical link controllers on the first and second optical communication devices include at least an optical switch equipment No., an interface No., a wavelength, a signal rate, a signal format, a distance between the opposed WDM transmission equipments in the optical multiplex section or physical characteristics of optical fibers constructing the optical links as the attribute items of the optical links.

28. A communication network according to claim 26, wherein: the optical link attribute tables to be administered by the optical link controllers on the WDM transmission equipments include at least a wavelength, a signal rate, a signal format and an optical multiplex section group No., a distance between the opposed WDM transmission equipments in the optical multiplex section or physical characteristics of optical fibers constructing the optical links as the attribute items of the optical links.

29. A communication network according to claim 26, wherein the attributes of the optical links, which have been discovered by collecting the common portions of the attribute items of the optical link attribute tables administered by the optical link controllers, include an output optical switch equipment No., an output interface No., a wavelength, a signal rate, a signal format, an optical multiplex section group No., an input optical switch equipment No., a distance between the opposed WDM transmission equipments in the optical multiplex section or physical characteristics of optical fibers constructing the optical links as the attribute items.

30. A communication network having a plurality of optical communication devices connected with each other through WDM transmission equipments, comprising:
   a first bi-directional in-band control channel provided in every optical links leading from the output interfaces of one optical communication device of first and second optical communication devices, which adjoin each other through an optical multiplex section including at least one set of opposed WDM transmission equipments and an arbitrary number of optical amplifiers between the opposed WDM transmission equipments, to the input interfaces of the other optical communication device of the first and second optical communication devices through the optical multiplex section, between the interfaces of the first and second optical communication devices and the ports of the WDM transmission equipments connected with the interfaces, along and for the every optical links; and
   a second bi-directional in-band control channel provided in the optical multiplex section between the output ports of one of the opposed WDM transmission equipments and the input ports of the other, along the optical links,
   wherein the first and second optical communication devices include: control channel terminators for terminating the first bi-directional in-band control channel; and optical link controllers for administering the every optical links by exchanging control messages through the control channel terminators, and
   wherein the opposed WDM transmission equipments include: control channel terminators for terminating the first and second bi-directional in-band control channels; and optical link controllers for administering the every optical links by exchanging control messages through the control channel terminators.

31. A communication network according to claim 30, wherein at least one of the first and second optical communication devices is an optical switch equipment which is constructed to use a transparent optical switch.

32. A communication network according to claim 30, wherein the individual optical link controllers of the first and second optical communication devices and the opposed WDM transmission equipments:
   administer individual optical link attribute tables for specifying the attribute items of the optical links and their attribute values individually for the every optical links;
   discover the attributes of the optical links by storing the individual optical link attribute tables in the control messages and exchanging them mutually, by comparing the attribute values for the every attribute items of the individual optical link attribute tables, and by collecting the common portions of the attribute values;
   set up the optical links, of which the discovery of the attributes has failed, in an initial state;
   set up the optical links, of which the discovery of the attributes has succeeded, in an usable state; and
   set up the optical links, of which no common portion of the attribute values has existed so that the discovery of the attributes has failed, as an error in an unusable state, thereby to perform the state administrations for the every optical links.

33. A communication network according to claim 32, wherein the optical link attribute tables to be administered by the optical link controllers on the first and second optical communication devices include at least an optical switch equipment No., an interface No., a wavelength, a signal rate and a signal format, a distance between the opposed WDM transmission equipments in the optical multiplex section or physical characteristics of optical fibers constructing the optical links as the attribute items of the optical links.

34. A communication network according to claim 32, wherein the optical link attribute tables to be administered by the optical link controllers on the WDM transmission equipments include at least a wavelength, a signal rate, a signal format and an optical multiplex section group No., a distance between the opposed WDM transmission equipments in the optical multiplex section or physical characteristics of optical fibers constructing the optical links as the attribute items of the optical links.

35. A communication network according to claim 32, wherein the attributes of the optical links, which have been discovered by collecting the common portions of the attribute items of the optical link attribute tables administered by the optical link controllers, include an output optical switch equipment No., an output interface No., a wavelength, a signal rate, a signal format, an optical multiplex section group No., an input optical switch equipment No., a distance between the opposed WDM transmission equipments in the optical multiplex section or physical characteristics of optical fibers constructing the optical links as the attribute items.

36. A WDM transmission equipment for forming an optical multiplex section together with opposed devices and an arbitrary number of optical amplifiers between the opposed devices, comprising:

a uni-directional in-band control channel provided in the optical multiplex section between the input/output ports of the opposed devices and along all optical links through the optical multiplex section;

a control channel terminator for terminating the uni-directional in-band control channel; and optical link controllers for administering the every optical links by exchanging control messages through the control channel terminators, wherein the optical link controllers:

administer individual optical link attribute tables for specifying the attribute items of the optical links and their attribute values for the every optical links;

discover the attributes of the optical links by storing the individual optical link attribute tables in the control messages and exchanging them mutually, by comparing the attribute values for the every attribute items of the individual optical link attribute tables, and by collecting the common portions of the attribute values;

set up the optical links, of which the discovery of the attributes has failed, in an initial state;

set up the optical links, of which the discovery of the attributes has succeeded, in an usable state; and set up the optical links, of which no common portion of the attribute values has existed so that the discovery of the attributes has failed, as an error in an unusable state, thereby to perform the state administrations for the every optical links.

37. A WDM transmission equipment according to claim 36, wherein the optical link attribute tables to be administered by the optical link controllers include at least a wavelength, a signal rate, a signal format and an optical multiplex section group No., a distance between the opposed WDM transmission equipments in the optical multiplex section or physical characteristics of optical fibers constructing the optical links as the attribute items of the optical links.

38. A WDM transmission equipment according to claim 36, wherein the attributes of the optical links, which have been discovered by collecting the common portions of the attribute items of the optical link attribute tables administered by the optical link controllers, include an output optical switch equipment No., an output interface No., a wavelength, a signal rate, a signal format, an optical multiplex section group No., an input optical switch equipment No., a distance between the opposed WDM transmission equipments in the optical multiplex section or physical characteristics of optical fibers constructing the optical links as the attribute items.

39. A WDM transmission equipment for forming an optical multiplex section together with opposed devices for transmitting downstream and upstream signals, respectively, and an arbitrary number of optical amplifiers between the opposed devices, comprising:

a first uni-directional in-band control channel provided in the optical multiplex section between the input/output ports of the opposed devices and along all downstream optical links through the optical multiplex section;

a second uni-directional in-band control channel provided in the optical multiplex section between the input/output ports of the opposed devices and along all upstream optical links through the optical multiplex section and directed in the direction opposite to the control channels in the downstream optical links;

a control channel terminator for terminating the first and second uni-directional in-band control channel; and optical link controllers for administering the every optical links by exchanging control messages through the control channel terminators, wherein the optical link controllers:

administer individual optical link attribute tables for specifying the attribute items of the optical links and their attribute values for the every optical links;

discover the attributes of the optical links by storing the individual optical link attribute tables in the control messages and exchanging them mutually, by comparing the attribute values for the every attribute items of the individual optical link attribute tables, and by collecting the common portions of the attribute values;

set up the optical links, of which the discovery of the attributes has failed, in an initial state;

set up the optical links, of which the discovery of the attributes has succeeded, in an usable state; and set up the optical links, of which no common portion of the attribute values has existed so that the discovery of the attributes has failed, as an error in an unusable state, thereby to perform the state administrations for the every optical links.

40. A WDM transmission equipment according to claim 39, wherein the optical link attribute tables to be administered by the optical link controllers include at least a wavelength, a signal rate, a signal format and an optical multiplex section group No., a distance between the opposed WDM transmission equipments in the optical multiplex section or physical characteristics of optical fibers constructing the optical links as the attribute items of the optical links.

41. A WDM transmission equipment according to claim 39, wherein the attributes of the optical links, which have been discovered by collecting the common portions of the attribute items of the optical link attribute tables administered by the optical link controllers, include an output optical switch equipment No., an output interface No., a wavelength, a signal rate, a signal format, an optical multiplex section group No., an input optical switch equipment No., a distance between the opposed WDM transmission equipments in the optical multiplex section or physical characteristics of optical fibers constructing the optical links as the attribute items.

42. A WDM transmission equipment for forming an optical multiplex section together with opposed devices and an arbitrary number of optical amplifiers between the opposed devices, comprising:

a bi-directional in-band control channel provided in the optical multiplex section between the input/output ports of the opposed devices and along all optical links through the optical multiplex section;

a control channel terminator for terminating the bi-directional in-band control channel; and optical link controllers for administering the every optical links by exchanging control messages through the control channel terminators, wherein the optical link controllers:

administer individual optical link attribute tables for specifying the attribute items of the optical links and their attribute values for the every optical links;

discover the attributes of the optical links by storing the individual optical link attribute tables in the control messages and exchanging them mutually, by comparing the attribute values for the every attribute items of the individual optical link attribute tables, and by collecting the common portions of the attribute values;

set up the optical links, of which the discovery of the attributes has failed, in an initial state;

set up the optical links, of which the discovery of the attributes has succeeded, in an usable state; and set up the optical links, of which no common portion of the attribute values has existed so that the discovery of the attributes has failed, as an error in an unusable state, thereby to perform the state administrations for the every optical links.

43. A WDM transmission equipment according to claim 42, wherein the optical link attribute tables to be administered by the optical link controllers include at least a wavelength, a signal rate, a signal format and an optical multiplex section group No., a distance between the opposed WDM transmission equipments in the optical multiplex section or physical characteristics of optical fibers constructing the optical links as the attribute items of the optical links.

44. A WDM transmission equipment according to claim 42, wherein the attributes of the optical links, which have been discovered by collecting the common portions of the attribute items of the optical link attribute tables administered by the optical link controllers, include an output optical switch equipment No., an output interface No., a wavelength, a signal rate, a signal format, an optical multiplex section group No., an input optical switch equipment No., a distance between the opposed WDM transmission equipments in the optical multiplex section or physical characteristics of optical fibers constructing the optical links as the attribute items.

45. An optical link attribute/state administrating method for a communication network having a plurality of optical communication devices connected with each other, comprising:

defining an optical link section leading from the output interfaces of a first optical communication device of a transmission source to the input interfaces of an adjoining second optical communication device;

providing in-band control channels for every optical links between the first and second optical communication devices; and exchanging the optical link attributes, as specified by the interfaces of the first and second optical communication devices, as control messages through the in-band control channels, wherein the optical link controllers:

administer individual optical link attribute tables for specifying the attribute items of the optical links and their attribute values individually for the every optical links;

discover the attributes of the optical links by storing the individual optical link attribute tables in the control messages and exchanging them mutually, by comparing the attribute values for the every attribute items of the individual optical link attribute tables, and by collecting the common portions of the attribute values;

set up the optical links, of which the discovery of the attributes has failed, in an initial state;

set up the optical links, of which the discovery of the attributes has succeeded, in an usable state; and set up the optical links, of which no common portion of the attribute values has existed so that the discovery of the attributes has failed, as an error in an unusable state, thereby to perform the state administrations for the every optical links.

46. A communication network according to claim 45, wherein the optical link attribute tables to be administered by the optical link controllers include a device No., an interface No., a wavelength, a signal rate and a signal format or physical characteristics of optical fibers constructing the optical links as the attribute items of the optical links.

47. An optical link attribute/state administering method according to claim 45, wherein the attributes of the optical links, which have been discovered by collecting the common portions of the attribute items of the optical link attribute tables administered by the optical link controllers, include an output device No., an output interface No., a wavelength, a signal rate, a signal format, an input device No., an input interface No., or physical characteristics of optical fibers constructing the optical links as the attribute items.

48. An optical link attribute/state administrating method for a communication network having a plurality of optical communication devices connected with each other through a WDM transmission equipment, comprising:

defining an optical link section leading from the output interfaces of a first optical communication device of a transmission source to the input interfaces of an adjoining second optical communication device;

providing in-band control channels for every optical links along optical links between the first and second optical communication devices and an optical multiplex section; and exchanging the optical link attributes, as specified by the interfaces of the first and second optical communication devices, and the optical link attributes, as specified by the optical multiplex section, as control messages through the in-band control channels, wherein the optical link controllers of the first and second optical communication devices and opposed WDM transmission equipments:

administer individual optical link attribute tables for specifying the attribute items of the optical links and their attribute values individually for the every optical links;

discover the attributes of the optical links by storing the individual optical link attribute tables in the control messages and exchanging them mutually, by comparing the attribute values for the every attribute items of the individual optical link attribute tables, and by collecting the common portions of the attribute values;

set up the optical links, of which the discovery of the attributes has failed, in an initial state;

set up the optical links, of which the discovery of the attributes has succeeded, in an usable state; and set up the optical links, of which no common portion of the attribute values has existed so that the discovery of the attributes has failed, as an error in an unusable state, thereby to perform the state administrations for the every optical links.

49. An optical link attribute/state administering method according to claim 48, wherein the optical link attribute tables to be administered by the optical link controllers on the first and second optical communication devices include at least an optical switch equipment No., an interface No., a wavelength, a signal rate, a signal format, a distance between the opposed WDM transmission equipments in the optical multiplex section or physical characteristics of optical fibers constructing the optical links as the attribute items of the optical links.

50. An optical link attribute/state administering method according to claim 48, wherein:

the optical link attribute tables to be administered by the optical link controllers on the WDM transmission equipment include at least a wavelength, a signal rate, a signal format and an optical multiplex section group No., a distance between the opposed WDM transmission equipments in the optical multiplex section or physical characteristics of optical fibers constructing the optical links as the attribute items of the optical links.

51. An optical link attribute/state administering method according to claim 48, wherein the attributes of the optical links, which have been discovered by collecting the common portions of the attribute items of the optical link attribute tables administered by the optical link controllers, include an output optical switch equipment No., an output interface No., a wavelength, a signal rate, a signal format, an optical multiplex section group No., an input optical switch equipment No., a distance between the opposed WDM transmission equipments in the optical multiplex section or physical characteristics of optical fibers constructing the optical links as the attribute items.

52. An optical switch equipment connected with adjoining optical communication device, comprising:
   uni-directional in-band control channels provided in every optical links leading from output interfaces to the input interfaces of the adjoining optical communication devices, between the interfaces of the adjoining optical communication devices for the every optical links;
   an out-band control channel provided between the adjoining optical communication devices;
   control channel terminators for terminating a uni-directional in-band control channel and an out-band control channel; and
   optical link controllers for administering the every optical links by exchanging control messages through the control channel terminators,
   wherein the signal wave band of the data channel on the optical links and the signal wave band of the uni-directional in-band control channels are identical,
   wherein the interfaces of the adjoining optical communication devices include 1×2 optical switches provided in all optical links, and
   wherein the optical links are employed as data channels during the data transmission and as control channels at other times by switching the 1×2 optical switches,
   wherein the optical link controllers:
   administer optical link attribute tables for specifying the attribute items of the optical links and their attribute values for the every optical links;
   exchange the optical link attribute tables with one of the adjoining optical communication devices and the adjoining optical switch equipments;
   compare the attribute values for the every attribute items of the optical link attribute tables;
   discover the attributes of the optical links by collecting the common portions of the attribute values;
   set up the optical links, of which no common portion of the attribute values has existed so that the discovery of the attributes has failed, as an error in an unusable state, thereby to perform the state administrations for the every optical links.

53. An optical switch equipment according to claim 52, wherein the optical link attribute tables to be administered by the optical link controllers include a device No., an interface No., a wavelength, a signal rate and a signal format or physical characteristics of optical fibers constructing the optical links as the attribute items of the optical links.

54. An optical switch equipment according to claim 52, wherein the attributes of the optical links, which have been discovered by collecting the common portions of the attribute items of the optical link attribute tables administered by the optical link controllers, include an output device No., an output interface No., a wavelength, a signal rate, a signal format, an input device No., an input interface No., or physical characteristics of optical fibers constructing the optical links as the attribute items.

55. An optical switch equipment connected with adjoining optical communication device, comprising:
   a first uni-directional in-band control channel provided in every downstream optical links leading from output interfaces to the input interfaces of the adjoining optical communication devices, between the interfaces of the adjoining optical communication devices for the every downstream optical links;
   a second uni-directional in-band control channel provided in every upstream optical links leading from the output interfaces of the adjoining optical communication devices to the input interfaces of the own device, between the interfaces of the adjoining optical communication devices for the every upstream optical links and directed in the direction opposite to the control channel in the downstream optical links;
   control channel terminators for terminating the first and second uni-directional in-band control channels; and
   optical link controllers for administering the every optical links by exchanging control messages through the control channel terminators,
   wherein the optical link controllers:
   administer optical link attribute tables for specifying the attribute items of the optical links and their attribute values for the every optical links;
   exchange the optical link attribute tables with one of the adjoining optical communication devices and the adjoining optical switch equipments;
   compare the attribute values for the every attribute items of the optical link attribute tables;
   discover the attributes of the optical links by collecting the common portions of the attribute values;
   set up the optical links, of which no common portion of the attribute values has existed so that the discovery of the attributes has failed, as an error in an unusable state, thereby to perform the state administrations for the every optical links.

56. An optical switch equipment according to claim 55, wherein the optical link attribute tables to be administered by the optical link controllers include a device No., an interface No., a wavelength, a signal rate and a signal format or physical characteristics of optical fibers constructing the optical links as the attribute items of the optical links.

57. An optical switch equipment according to claim 55, wherein the attributes of the optical links, which have been discovered by collecting the common portions of the attribute items of the optical link attribute tables administered by the optical link controllers, include an output device No., an output interface No., a wavelength, a signal rate, a signal format, an input device No., an input interface No., or physical characteristics of optical fibers constructing the optical links as the attribute items.

58. An optical switch equipment connected with adjoining optical communication device, comprising:
   a bi-directional in-band control channel provided in every optical links leading from output interfaces to the input interfaces of the adjoining optical communication devices, between the interfaces of the adjoining optical communication devices for the every optical links;
   a control channel terminator for terminating a bi-directional in-band control channel; and optical link controllers for administering the every optical links by exchanging control messages through the control channel terminators,
wherein the optical link controllers:
administer optical link attribute tables for specifying the attribute items of the optical links and their attribute values for the every optical links;
exchange the optical link attribute tables with one of the adjoining optical communication devices and the adjoining optical switch equipments;
compare the attribute values for the every attribute items of the optical link attribute tables;
discover the attributes of the optical links by collecting the common portions of the attribute values;
set up the optical links, of which no common portion of the attribute values has existed so that the discovery of the attributes has failed, as an error in an unusable state,
thereby to perform the state administrations for the every optical links.

59. An optical switch equipment according to claim 58, wherein the optical link attribute tables to be administered by the optical link controllers include a device No., an interface No., a wavelength, a signal rate and a signal format or physical characteristics of optical fibers constructing the optical links as the attribute items of the optical links.

60. An optical switch equipment according to claim 58, wherein the attributes of the optical links, which have been discovered by collecting the common portions of the attribute items of the optical link attribute tables administered by the optical link controllers, include an output device No., an output interface No., a wavelength, a signal rate, a signal format, an input device No., an input interface No., or physical characteristics of optical fibers constructing the optical links as the attribute items.

* * * * *